United States Patent
Lee et al.

(10) Patent No.: US 9,703,558 B2
(45) Date of Patent: Jul. 11, 2017

(54) SYSTEMS, APPARATUSES, AND METHODS FOR SETTING AN OUTPUT MASK IN A DESTINATION WRITEMASK REGISTER FROM A SOURCE WRITE MASK REGISTER USING AN INPUT WRITEMASK AND IMMEDIATE

(75) Inventors: Victor W. Lee, Santa Clara, CA (US); Daehyun Kim, San Jose, CA (US); Tin-Fook Ngai, San Jose, CA (US); Jayashankar Bharadwaj, Saratoga, CA (US); Albert Hartono, Santa Clara, CA (US); Sara Baghsorkhi, San Jose, CA (US); Nalini Vasudevan, Sunnyvale, CA (US)

(73) Assignee: Intel Corporation, Santa Clara, CA (US)

( * ) Notice: Subject to any disclaimer, the term of this patent is extended or adjusted under 35 U.S.C. 154(b) by 619 days.

(21) Appl. No.: 13/991,877

(22) PCT Filed: Dec. 23, 2011

(86) PCT No.: PCT/US2011/067219
§ 371 (c)(1),
(2), (4) Date: Jun. 5, 2013

(87) PCT Pub. No.: WO2013/095642
PCT Pub. Date: Jun. 27, 2013

(65) Prior Publication Data
US 2014/0223139 A1    Aug. 7, 2014

(51) Int. Cl.
*G06F 15/76* (2006.01)
*G06F 9/305* (2006.01)
(Continued)

(52) U.S. Cl.
CPC ...... *G06F 9/30036* (2013.01); *G06F 9/30018* (2013.01); *G06F 9/30021* (2013.01);
(Continued)

(58) Field of Classification Search
CPC ............ G06F 9/30018; G06F 9/30021; G06F 9/30072; G06F 9/30036; G06F 9/30025;
(Continued)

(56) References Cited

U.S. PATENT DOCUMENTS 4,841,438 A * 6/1989 Yoshida .............. G06F 15/8084
712/5
5,207,132 A    5/1993 Goss et al.
(Continued)

FOREIGN PATENT DOCUMENTS

| TW | 200406684 A | 5/2004 |
|---|---|---|
| TW | I223193 B | 11/2004 |
| TW | I238943 B | 9/2005 |

OTHER PUBLICATIONS

PCT International Search Report for PCT Counterpart Application No. PCT/US2011/067219, 3 pgs., (Feb. 5, 2013).
(Continued)

*Primary Examiner* — Daniel Pan
(74) *Attorney, Agent, or Firm* — Nicholson De Vos Webster & Elliott, LLP

(57) ABSTRACT

Embodiments of systems, apparatuses, and methods for performing in a computer processor generation of a predicate mask based on vector comparison in response to a single instruction are described.

14 Claims, 38 Drawing Sheets

(51) Int. Cl.
*G06F 9/315* (2006.01)
*G06F 15/80* (2006.01)
*G06F 9/30* (2006.01)

(52) U.S. Cl.
CPC ...... *G06F 9/30072* (2013.01); *G06F 9/30025* (2013.01); *G06F 15/8007* (2013.01); *G06F 15/8053* (2013.01); *G06F 15/8084* (2013.01); *G06F 15/8092* (2013.01)

(58) Field of Classification Search
CPC ............. G06F 9/30032; G06F 15/8007; G06F 15/8053; G06F 15/8084; G06F 15/8092
USPC .............................. 712/2–9, 22, 222, 23, 224
See application file for complete search history.

(56) References Cited

U.S. PATENT DOCUMENTS

| | | |
|---|---|---|
| 5,446,912 A | 8/1995 | Colwell et al. |
| 5,457,803 A | 10/1995 | Sato et al. |
| 6,484,255 B1 | 11/2002 | Dulong |
| 6,671,797 B1 * | 12/2003 | Golston .............. G06F 9/30036 712/213 |
| 7,921,263 B2 | 4/2011 | Taunton |
| 2003/0005268 A1 * | 1/2003 | Catherwood ....... G06F 9/30018 712/223 |
| 2009/0172365 A1 * | 7/2009 | Orenstien ........... G06F 9/30032 712/225 |

OTHER PUBLICATIONS

PCT Written Opinion of the International Searching Authority for PCT Counterpart Application No. PCT/US2011/067219, 4 pgs., (Feb. 5, 2013).

Notification of Transmittal of the International Search Report and the Written Opinion or the International Searching Authority, or the Declaration for PCT Counterpart Application No. PCT/US2011/067219, 6 pgs., (Jul. 3, 2014).

Notice of Allowance with English translation from Taiwan Patent Application No. 101146862, dated May 25, 2015, 3 pages.

Office action and Search Report with English translation from Chinese Patent Application No. 201180075865.9, dated Sep. 9, 2016, 13 pages.

* cited by examiner

```
void vkSetTillFirstTrue (mask *k3, mask *k2, mask *k1) {
int j;
Bool firstBit = TRUE;
for (j=0; j<VLEN; j++) {
        if (k2[j]) {
                if (k1[j]) {
                        if (firstBit == FALSE) {
                                k3[j] = 0;
                                break;
                        }
                }
                else { // if (K1[j] == 0)
                        k3[j] = 1;
                }
                firstBit = FALSE;
        }
        else { // if (k2[j] == 0)
                k3[j] = 0;
        }
}
// clear the remaining bits
for (; j<VLEN; j++) {
        k3[j] = 0;
}
}
```

FIG. 2(D)

```
void vkSetTillFirstTrueInclusive (mask *k3, mask *k2, mask *k1) {
int j;
Bool firstBit = TRUE;
for (j=0; j<VLEN; j++) {
    if (k2[j]) {
        if (k1[j]) {
            if (firstBit == FALSE) {
                k3[j] = 1;
                break;
            }
        }
        else { // if (K1[j] == 0)
            k3[j] = 1;
        }
        firstBit = FALSE;
    }
    else { // if (k2[j] == 0)
        k3[j] = 0;
    }
}
for (; j<VLEN; j++) {
    k3[j] = 0;
}
}
```

FIG. 4(D)

```
void vkSetTillFirstTruePair(mask *k4, mask *k3, mask *k1, mask *k2) {
    int j;
    Bit trueSeen = 0;
    // clear all bits first
    for (j=0; j<VECLEN; j++) {
        k4[j] = 0;
    }
    // Set bits to 1 until first predicate conflict is seen
    for (j=0; j<VECLEN; j++) {
        if (k3[j] == 1) {
            if (k1[j] & trueSeen)
                return;
            if (k2[j])
                trueSeen = 1;
            k4[j] = 1;
        }
    }
}
```

FIG. 5(D)

```
void vkSetTillFirstTruePairInclusive(mask *k4, mask *k3, mask *k1, mask *k2) {
    int j;
    Bit trueSeen = 0;
    // clear all bits first
    for (j=0; j<VECLEN; j++) {
        k4[j] = 0;
    }
    // Set bits to 1 until first predicate conflict is seen
    for (j=0; j<VECLEN; j++) {
        if (k3[j] == 1) {
            k4[j] = 1;
            if (k1[j] & trueSeen)
                return;
            if (k2[j])
                trueSeen = 1;
        }
    }
}
```

FIG. 6(D)

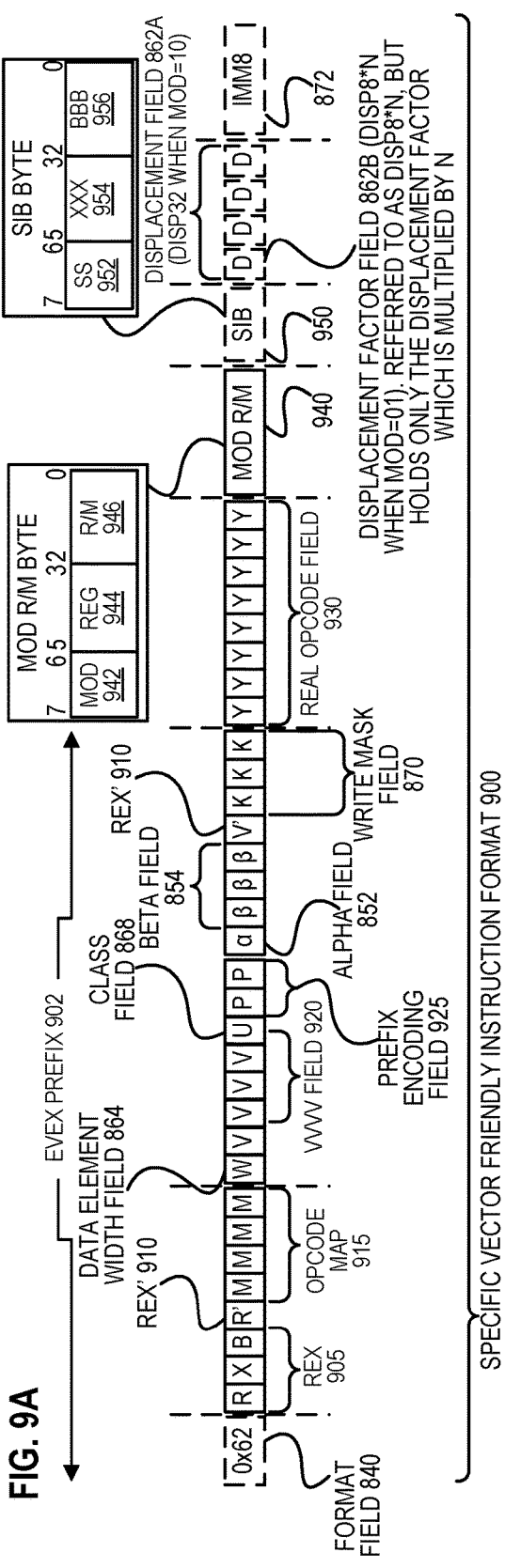
FIG. 9A
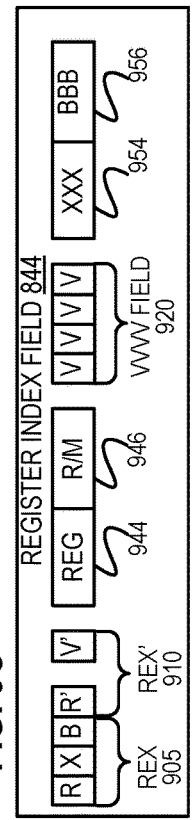
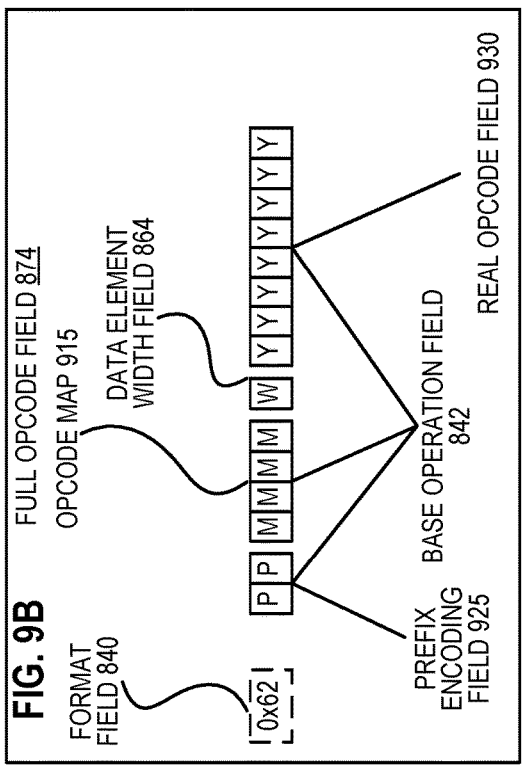
FIG. 9C
FIG. 9B

REGISTER ARCHITECTURE 1000
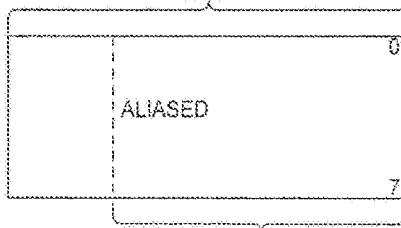
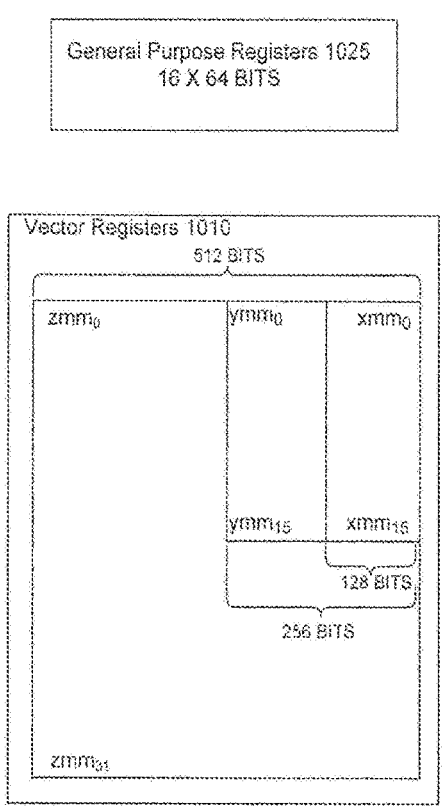
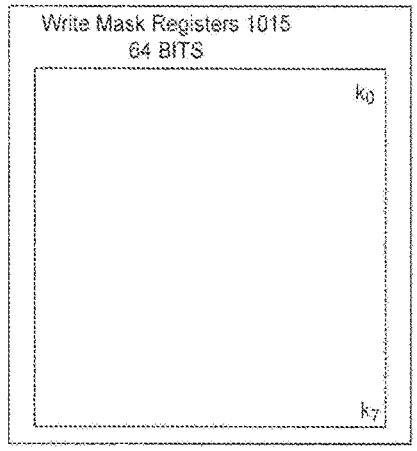
FIG. 10

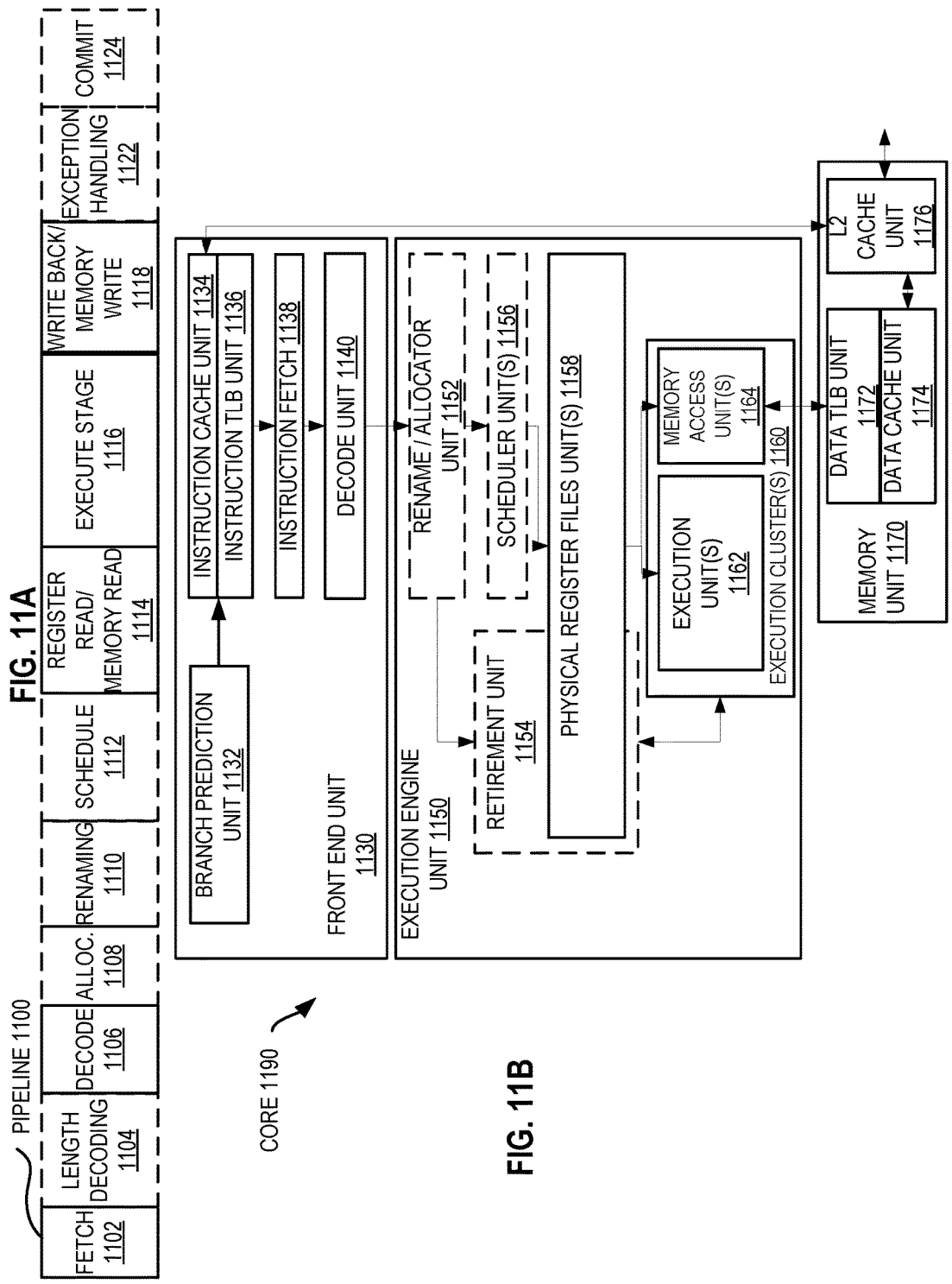

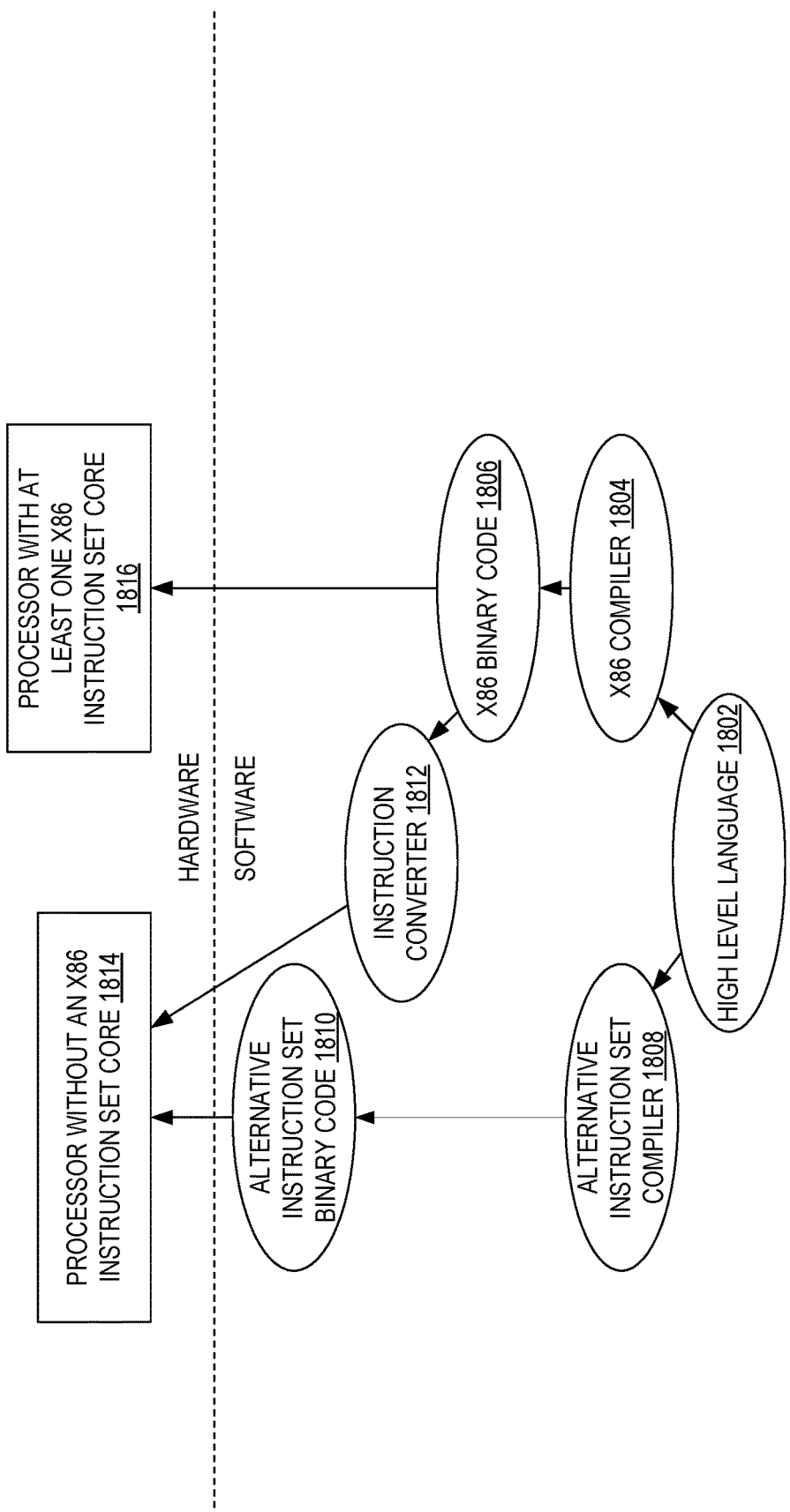

SYSTEMS, APPARATUSES, AND METHODS FOR SETTING AN OUTPUT MASK IN A DESTINATION WRITEMASK REGISTER FROM A SOURCE WRITE MASK REGISTER USING AN INPUT WRITEMASK AND IMMEDIATE

CROSS-REFERENCE TO RELATED APPLICATION

This patent application is a U.S. National Phase Application under 35 U.S.C. §371 of International Application No. PCT/US2011/067219, filed Dec. 23, 2011, entitled SYSTEMS, APPARATUSES, AND METHODS FOR SETTING AN OUTPUT MASK IN A DESTINATION WRITEMASK REGISTER FROM A SOURCE WRITE MASK REGISTER USING AN INPUT WRITEMASK AND IMMEDIATE.

FIELD OF INVENTION

The field of invention relates generally to computer processor architecture, and, more specifically, to instructions which when executed cause a particular result.

BACKGROUND

An instruction set, or instruction set architecture (ISA), is the part of the computer architecture related to programming, and may include the native data types, instructions, register architecture, addressing modes, memory architecture, interrupt and exception handling, and external input and output (I/O). It should be noted that the term instruction generally refers herein to a macro-instruction—that is instructions that are provided to the processor for execution—as opposed to micro-instructions or micro-ops—that result from a processor's decoder decoding macro-instructions).

The instruction set architecture is distinguished from the microarchitecture, which is the internal design of the processor implementing the ISA. Processors with different microarchitectures can share a common instruction set. For example, Intel Pentium 4 processors, Intel Core processors, and Advanced Micro Devices, Inc. of Sunnyvale Calif. processors implement nearly identical versions of the x86 instruction set (with some extensions having been added to newer versions), but have different internal designs. For example, the same register architecture of the ISA may be implemented in different ways in different micro-architectures using well known techniques, including dedicated physical registers, one or more dynamically allocated physical registers using a register renaming mechanism (e.g., the use of a Register Alias Table (RAT), a Reorder Buffer (ROB) and a retirement register file as described in U.S. Pat. No. 5,446,912; the use of multiple maps and a pool of registers as described in U.S. Pat. No. 5,207,132), etc. Unless otherwise specified, the phrases register architecture, register file, and register refer to that which is visible to the software/programmer and the manner in which instructions specify registers. Where specificity is desired, the adjective logical, architectural, or software visible will be used to indicate registers/files in the register architecture, while different adjectives will be used to designate registers in a given micro-architecture (e.g., physical register, reorder buffer, retirement register, register pool).

An instruction set includes one or more instruction formats. A given instruction format defines various fields (number of bits, location of bits) to specify, among other things, the operation to be performed and the operand(s) on which that operation is to be performed. A given instruction is expressed using a given instruction format and specifies the operation and the operands. An instruction stream is a specific sequence of instructions, where each instruction in the sequence is an occurrence of an instruction in an instruction format.

Scientific, financial, auto-vectorized general purpose, RMS (recognition, mining, and synthesis)/visual and multimedia applications (e.g., 2D/3D graphics, image processing, video compression/decompression, voice recognition algorithms and audio manipulation) often require the same operation to be performed on a large number of data items (referred to as "data parallelism"). Single Instruction Multiple Data (SIMD) refers to a type of instruction that causes a processor to perform the same operation on multiple data items. SIMD technology is especially suited to processors that can logically divide the bits in a register into a number of fixed-sized data elements, each of which represents a separate value. For example, the bits in a 64-bit register may be specified as a source operand to be operated on as four separate 16-bit data elements, each of which represents a separate 16-bit value. As another example, the bits in a 256-bit register may be specified as a source operand to be operated on as four separate 64-bit packed data elements (quad-word (Q) size data elements), eight separate 32-bit packed data elements (double word (D) size data elements), sixteen separate 16-bit packed data elements (word (W) size data elements), or thirty-two separate 8-bit data elements (byte (B) size data elements). This type of data is referred to as the packed data type or vector data type, and operands of this data type are referred to as packed data operands or vector operands. In other words, a packed data item or vector refers to a sequence of packed data elements; and a packed data operand or a vector operand is a source or destination operand of a SIMD instruction (also known as a packed data instruction or a vector instruction).

By way of example, one type of SIMD instruction specifies a single vector operation to be performed on two source vector operands in a vertical fashion to generate a destination vector operand (also referred to as a result vector operand) of the same size, with the same number of data elements, and in the same data element order. The data elements in the source vector operands are referred to as source data elements, while the data elements in the destination vector operand are referred to a destination or result data elements. These source vector operands are of the same size and contain data elements of the same width, and thus they contain the same number of data elements. The source data elements in the same bit positions in the two source vector operands form pairs of data elements (also referred to as corresponding data elements; that is, the data element in data element position 0 of each source operand correspond, the data element in data element position 1 of each source operand correspond, and so on). The operation specified by that SIMD instruction is performed separately on each of these pairs of source data elements to generate a matching number of result data elements, and thus each pair of source data elements has a corresponding result data element. Since the operation is vertical and since the result vector operand is the same size, has the same number of data elements, and the result data elements are stored in the same data element order as the source vector operands, the result data elements are in the same bit positions of the result vector operand as their corresponding pair of source data elements in the source vector operands. In addition to this exemplary type of SIMD instruction, there are a variety of other types of SIMD instructions (e.g., that have only one or has more than two source vector operands; that operate in a horizontal fashion; that generate a result vector operand that is of a different size, that have a different size of data elements, and/or that have a different data element order). It should be understood that the term destination vector operand (or destination operand) is defined as the direct result of performing the operation specified by an instruction, including the storage of that destination operand at a location (be it a register or at a memory address specified by that instruction) so that it may be accessed as a source operand by another instruction (by specification of that same location by the another instruction.

The SIMD technology, such as that employed by the Intel® Core™ processors having an instruction set including x86, MMX™, Streaming SIMD Extensions (SSE), SSE2, SSE3, SSE4.1, and SSE4.2 instructions, has enabled a significant improvement in application performance (Core™ and MMX™ are registered trademarks or trademarks of Intel Corporation of Santa Clara, Calif.). An additional set of SIMD extensions, referred to the Advanced Vector Extensions (AVX) (AVX1 and AVX2) and using the VEX coding scheme, has been released and/or published (e.g., see Intel® 64 and IA-32 Architectures Software Developers Manual, October 2011; and see Intel® Advanced Vector Extensions Programming Reference, June 2011).

Many modern day processors are extending their capabilities to perform SIMD operations to address the continued need for vector floating-point performance in mainstream scientific and engineering numerical applications, visual processing, recognition, data-mining/synthesis, gaming, physics, cryptography and other areas of applications. Additionally, some processors are utilizing predication including the use of writemasks to perform operations on particular data elements of SIMD register.

SIMD architectures can only deliver maximum performance when executing vectorized code. However, a compiler is not always able to vectorize code. For example, when a loop has a lexically backward loop carried data dependency that cannot be resolved until run time, the compiler cannot vectorize the loop.

BRIEF DESCRIPTION OF THE DRAWINGS

The present invention is illustrated by way of example and not limitation in the figures of the accompanying drawings, in which like references indicate similar elements and in which:

FIG. 2(D) illustrates a pseudo-code implementation of this instruction.

FIG. 4(D) illustrates a pseudo-code implementation of this instruction.

FIG. 5(D) illustrates a pseudo-code implementation of this instruction.

FIG. 6(D) illustrates a pseudo-code implementation of this instruction.

FIGS. 9A-D are block diagrams illustrating an exemplary specific vector friendly instruction format according to embodiments of the invention FIG. 10 is a block diagram of a register architecture according to one embodiment of the invention FIG. 11A is a block diagram illustrating both an exemplary in-order pipeline and an exemplary register renaming, out-of-order issue/execution pipeline according to embodiments of the invention.

FIG. 11B is a block diagram illustrating both an exemplary embodiment of an in-order architecture core and an exemplary register renaming, out-of-order issue/execution architecture core to be included in a processor according to embodiments of the invention.

FIG. 18 is a block diagram contrasting the use of a software instruction converter to convert binary instructions in a source instruction set to binary instructions in a target instruction set according to embodiments of the invention.

DETAILED DESCRIPTION

Figure 1A:
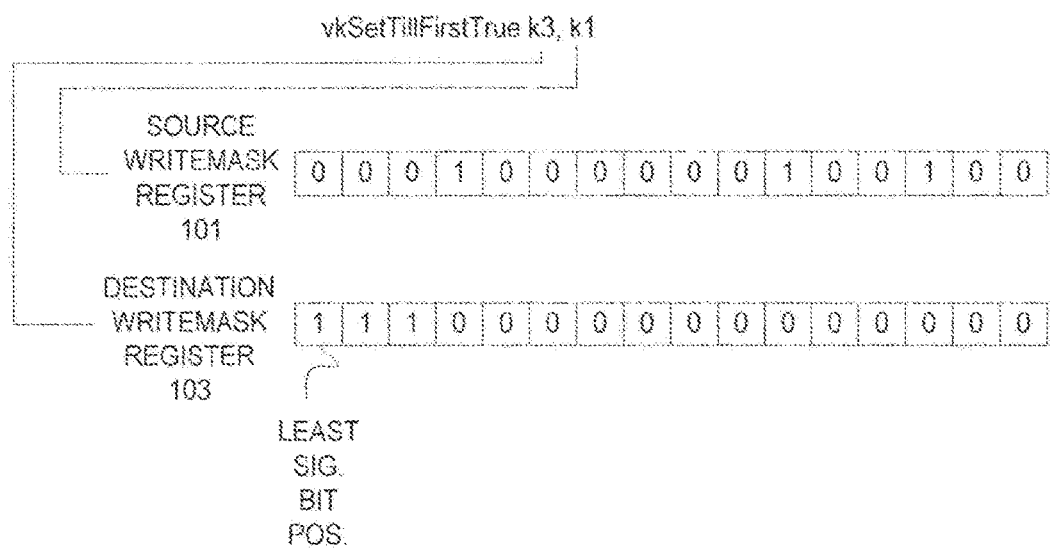
FIG. 1(A) illustrates an example of an operation of vkSetTillFirstTrue that does not use a control writemask or the control writemask is all set to true.

In the following description, numerous specific details are set forth. However, it is understood that embodiments of the invention may be practiced without these specific details. In other instances, well-known circuits, structures and techniques have not been shown in detail in order not to obscure the understanding of this description.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Overview

In the description below, there are some items that may need explanation prior to describing the operations of this particular instruction in the instruction set architecture. One such item is called a "writemask register" which is generally used to predicate an operand to conditionally control per-element computational operation (below, the term mask register may also be used and it refers to a writemask register such as the "k" registers discussed below). As used below, a writemask register stores a plurality of bits (16, 32, 64, etc.) wherein each active bit of the writemask register governs the operation/update of a packed data element of a vector register during SIMD processing. Typically, there is more than one writemask register available for use by a processor core.

The instruction set architecture includes at least some SIMD instructions that specify vector operations and that have fields to select source registers and/or destination registers from these vector registers (an exemplary SIMD instruction may specify a vector operation to be performed on the contents of one or more of the vector registers, and the result of that vector operation to be stored in one of the vector registers). Different embodiments of the invention may have different sized vector registers and support more/less/different sized data elements.

The size of the multi-bit data elements specified by a SIMD instruction (e.g., byte, word, double word, quad word) determines the bit locations of the "data element positions" within a vector register, and the size of the vector operand determines the number of data elements. A packed data element refers to the data stored in a particular position. In other words, depending on the size of the data elements in the destination operand and the size of the destination operand (the total number of bits in the destination operand) (or put another way, depending on the size of the destination operand and the number of data elements within the destination operand), the bit locations of the multi-bit data element positions within the resulting vector operand change (e.g., if the destination for the resulting vector operand is a vector register, then the bit locations of the multi-bit data element positions within the destination vector register change). For example, the bit locations of the multi-bit data elements are different between a vector operation that operates on 32-bit data elements (data element position 0 occupies bit locations 31:0, data element position 1 occupies bit locations 63:32, and so on) and a vector operation that operates on 64-bit data elements (data element position 0 occupies bit locations 63:0, data element position 1 occupies bit locations 127:64, and so on).

Figure 7:
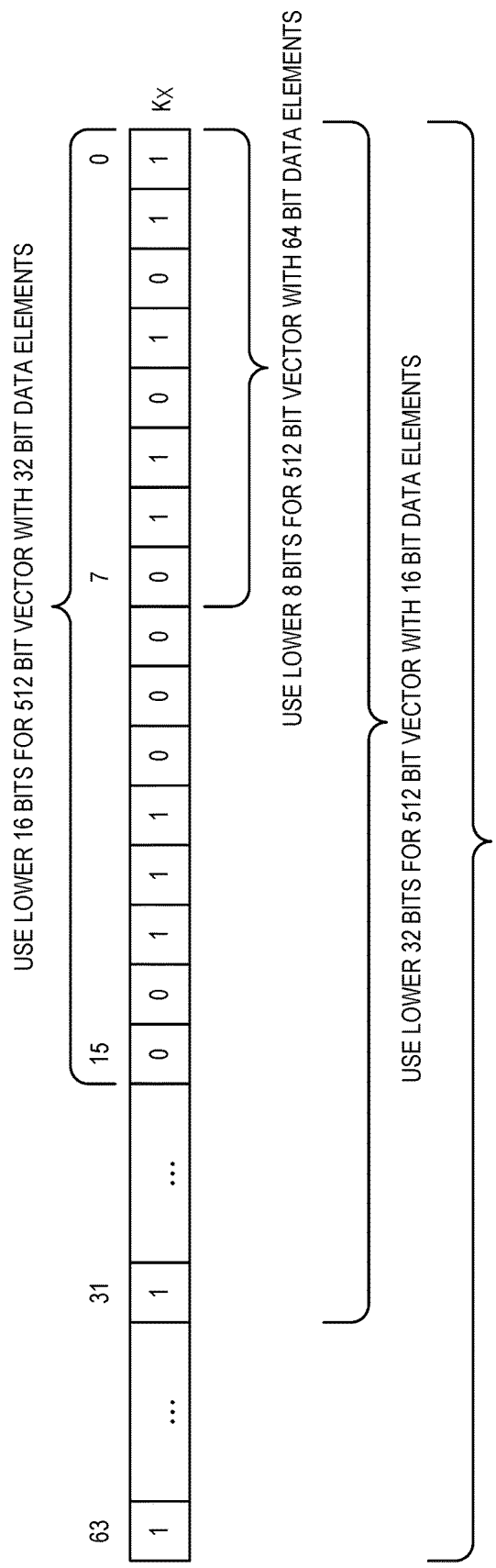
FIG. 7 illustrates a correlation between the number of one active bit vector writemask elements and the vector size and the data element size according to one embodiment of the invention.

Additionally, there is a correlation between the number of one active bit vector writemask elements and the vector size and the data element size according to one embodiment of the invention as shown in FIG. 7. Vector sizes of 128-bits, 256-bits, and 512-bits are shown, although other widths are also possible. Data element sizes of 8-bit bytes (B), 16-bit words (W), 32-bit doublewords (D) or single precision floating point, and 64-bit quadwords (Q) or double precision floating point are considered, although other widths are also possible. As shown, when the vector size is 128-bits, 16-bits may be used for masking when the vector's data element size is 8-bits, 8-bits may be used for masking when the vector's data element size is 16-bits, 4-bits may be used for masking when the vector's data element size is 32-bits, and 2-bits may be used for masking when the vector's data element size is 64-bits. When the vector size is 256-bits, 32-bits may be used for masking when the packed data element width is 8-bits, 16-bits may be used for masking when the vector's data element size is 16-bits, 8-bits may be used for masking when the vector's data element size is 32-bits, and 4-bits may be used for masking when the vector's data element size is 64-bits. When the vector size is 512-bits, 64-bits may be used for masking when the vector's data element size is 8-bits, 32-bits may be used for masking when the vector's data element size is 16-bits, 16-bits may be used for masking when the vector's data element size is 32-bits, and 8-bits may be used for masking when the vector's data element size is 64-bits.

Depending upon the combination of the vector size and the data element size, either all 64-bits, or only a subset of the 64-bits, may be used as a write mask. Generally, when a single, per-element masking control bit is used, the number of bits in the vector writemask register used for masking (active bits) is equal to the vector size in bits divided by the vector's data element size in bits.

Below are embodiments of instructions that work well with existing vector instruction sets. In the code below, there is a conditional check of A[i] in the middle of the loop body. Since the address computation for the load of A[i+j] depends on j computed in a previous iteration this loop is not vectorizable. However, since this circular dependence is conditionally executed, the loop is vectorizable as long as the condition (A[i]<K) is not true more than once within the vector space. This is dynamic data that the compiler would not know, so it would not vectorize the code.

```
j = 0;
for (i=0; i<N; i++) {
    if (A[i] < K) {
        j = A[i+j];
    }
    B[i] = j;
}
```

One way for the compiler to vectorize the code is to insert checks during the vector execution for data dependency and to break execution when data dependency fails. Pseudo code of the solution may look like the following:
1) Perform vector load of A[i] to vector register (v0)
2) Compare vector register (v0) value to constant K. Set mask (k0) if condition is met.
3) Create a partial execution mask (k1) based on mask (k0) computed in step 2.
4) Predicate the execution of j=A[i+j] using partial execution mask (k1) created in step 3.
Note: full vector execution will be performed, if condition is not met. In that case, partial execution mask will be all "1" to indicate all elements should participate in the execution.
5) In case of partial execution, repeat execution for remaining unexecuted elements in the vector.

The instructions below provide a solution to step #3 in the pseudo code above. Each of the proposed instructions generates a predicate mask based on vector comparison to drive the subsequent vector execution.

The first two instructions are vkSetTillFirstTrue{Inclusive} instructions which typically set an output writemask register (k3) based on the input writemask register (k1) subject to control writemask register (k2). Each bit of k3 is set according to the condition in k1. For the inclusive version, all bits before and including the first "true" bit in k1 are set subject to the control writemask. For the non-inclusive version, all bits before the first "true" bit in k1 are set subject to the control writemask (not including the bit that is "true") unless the position of this first "true" bit is also the first "true" in the control writemask too. The two instructions differ in whether the bit corresponds to a true condition (in mask k1) is set at the output mask (k3) or not. The non-inclusive version is generally described with respect FIGS. 1 and 2 (including the sub parts) and the inclusive version is generally described with respect to FIGS. 3 and 4 (including the sub parts).

FIG. 1(A) illustrates an example of an operation of vkSetTillFirstTrue that does not use a control writemask or the control writemask is all set to true. In this example, the illustrated writemask registers are arranged such that the least significant bit position is on the left-hand side. This convention is used throughout this document, however, it is not to be taken as the sole way for data to be stored. In fact, these registers typically store data with the least significant bit position to the far right.

The source writemask register 101 shown has 16 active bits. As will be detailed below with respect particular architectures that this instruction may be used in, other register sizes with more or less active bits may be utilized. As illustrated, the first true value (i.e., 1) in the source writemask register 101 is in bit position 3 (the fourth from the left). As such, the first three bit positions (0, 1, 2) of the destination writemask register 103 are set to also be true. Bit position 3 of the destination register is not set to true because the instruction is not inclusive of that bit position. Additionally, in this example as noted above, a control writemask register is either not used or is all 1s. As such, its presence or lack thereof has no impact on the execution of this instruction.

Figure 1B:
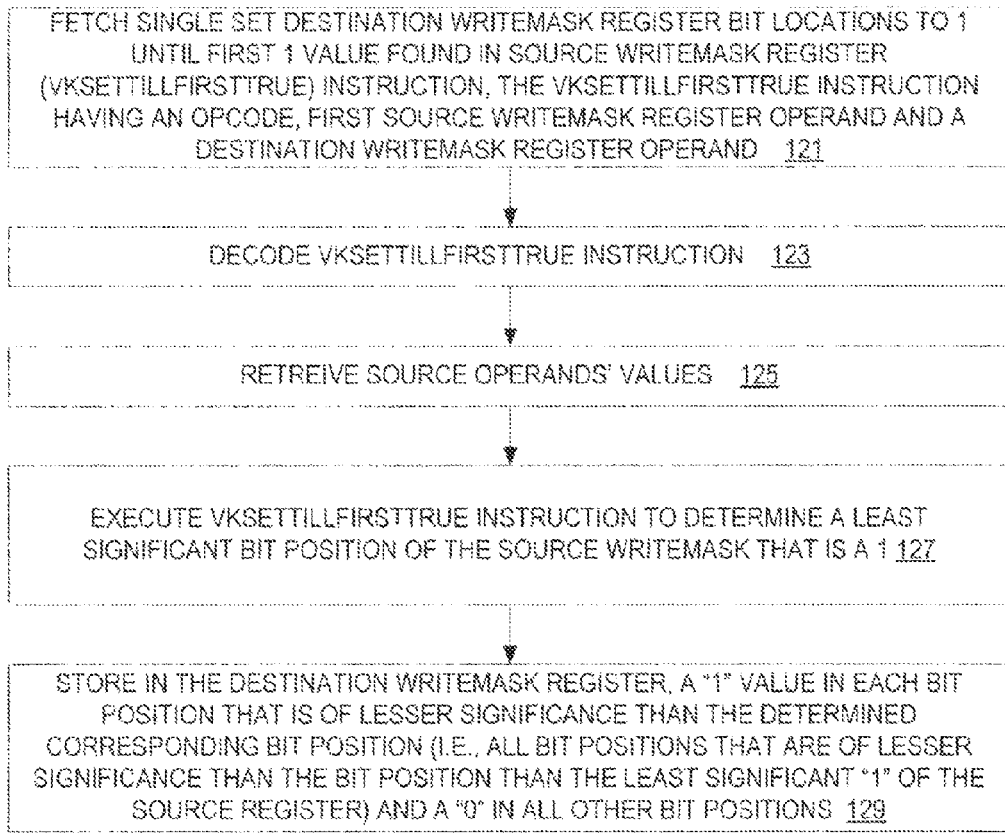
FIG. 1(B) illustrates an embodiment of the use of a vkSetTilFirstTrue without a control writemask register instruction in a processor.

FIG. 1(B) illustrates an embodiment of the use of a vkSetTilFirstTrue without a control writemask register instruction in a processor. A vkSetTilFirstTrue instruction with a destination writemask register operand, opcode, and a source writemask register operand is fetched at 121.

The vkSetTilFirstTrue instruction is decoded by decoding logic at 123. Depending on the instruction's format, a variety of data may be interpreted at this stage such as if there is to be a data transformation, which registers to write to and retrieve, what memory address to access, etc.

The source operand values are retrieved/read at 125. For example, the source writemask register is read.

The vkSetTilFirstTrue instruction (or operations comprising such an instruction such as microoperations) is executed by execution resources such as one or more functional units at 127 to determine a least significant bit position of the source writemask register that is a true value (i.e., a 1). In the example of FIG. 1(A), this occurs at bit position 3.

A true value (i.e., a 1) is stored in each bit position of the destination writemask register that is of lesser significance than the determined corresponding bit position (i.e., all bit positions that are of lesser significance than the bit position than the least significant 1 of the source writemask register) at 129. In some embodiments, a 0 is written to all other bit positions of the destination register at this time.

While 127 and 129 have been illustrated separately, in some embodiments they are performed together as a part of the execution of the instruction.

Figure 1C:
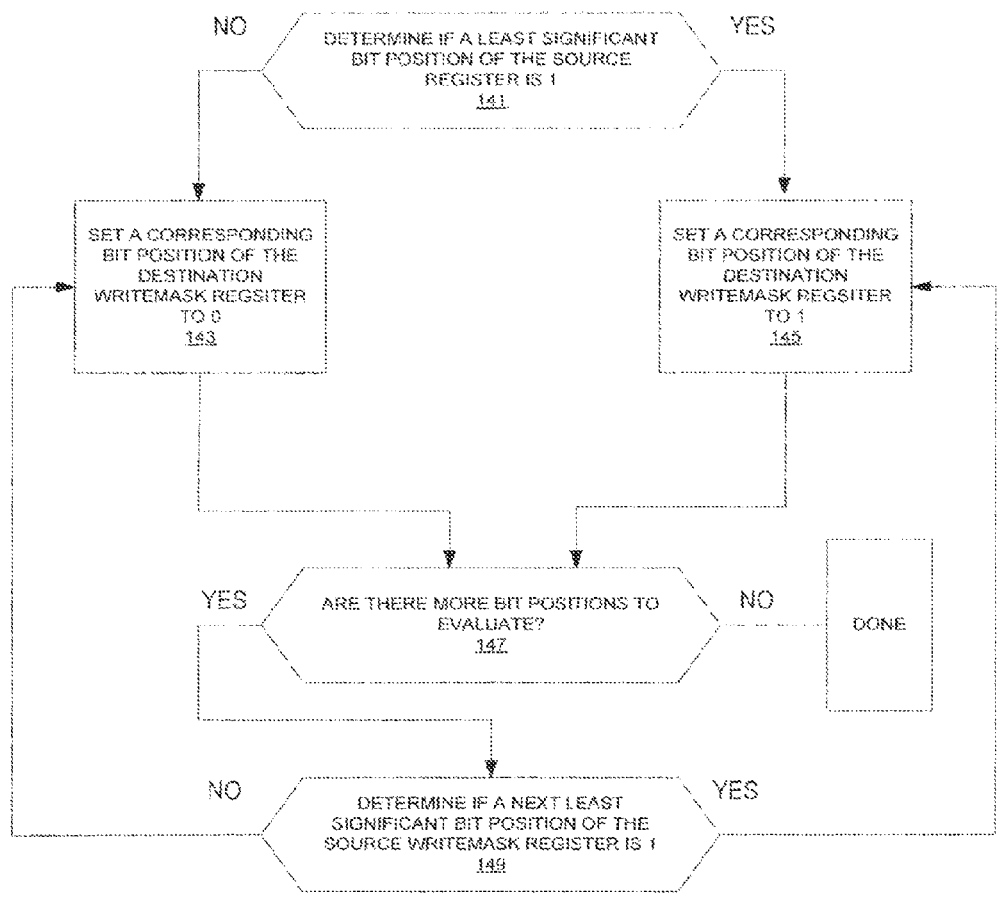
FIG. 1(C) illustrates an embodiment of a method for processing a vkSetTilFirstTrue instruction that includes a source writemask register, a destination writemask register, and an opcode.

FIG. 1(C) illustrates an embodiment of a method for processing a vkSetTilFirstTrue instruction that includes a source writemask register, a destination writemask register, and an opcode. What is described below occurs after the fetching of the instruction. In some embodiments, prior to any of these operations, all of the bits of the destination writemask register are set to 0.

At 141, a determination of if a least significant bit position of the source writemask register is true (i.e., 1) is made. If yes, then a corresponding bit position of the destination writemask are set to true (i.e., 1) at 145.

If not, then the corresponding bit position of the destination writemask register is set to false (i.e., 0) at 143. In the example of FIG. 1(A), the determination of 141 was that the value was not true. As such, the least significant bit position of the destination writemask register was set to 1.

A determination of if there are more bit positions to evaluate may be made at 147. This is not typically done after the least significant bit position has been evaluated, but in some embodiments it occurs at this point. If all of the bit positions that should be evaluated have been evaluated, then the instruction is complete. The number of bit positions to evaluate is typically determined by a vector length.

If there are more bit positions to evaluate, then a determination of if a next least significant bit position of the source writemask register is true (i.e., 1) is made at 149. In the example of FIG. 1(A), this would be bit position 1 at this point in the method. If yes, the method goes to step 145, and if not, it goes to step 143.

Additionally, in some embodiments there are two special instance that may be treated differently. The first such case occurs when the least significant bit of the source writemask register is set to true (i.e., 1) and all of the other bits are set to false (i.e., 0). In this scenario the destination writemask register will be set to all true (1s). The second case occurs when all bits of the source writemask register are false (i.e., 0). Here, all of the destination writemask register are set to be true (i.e., 1).

Figure 2A:
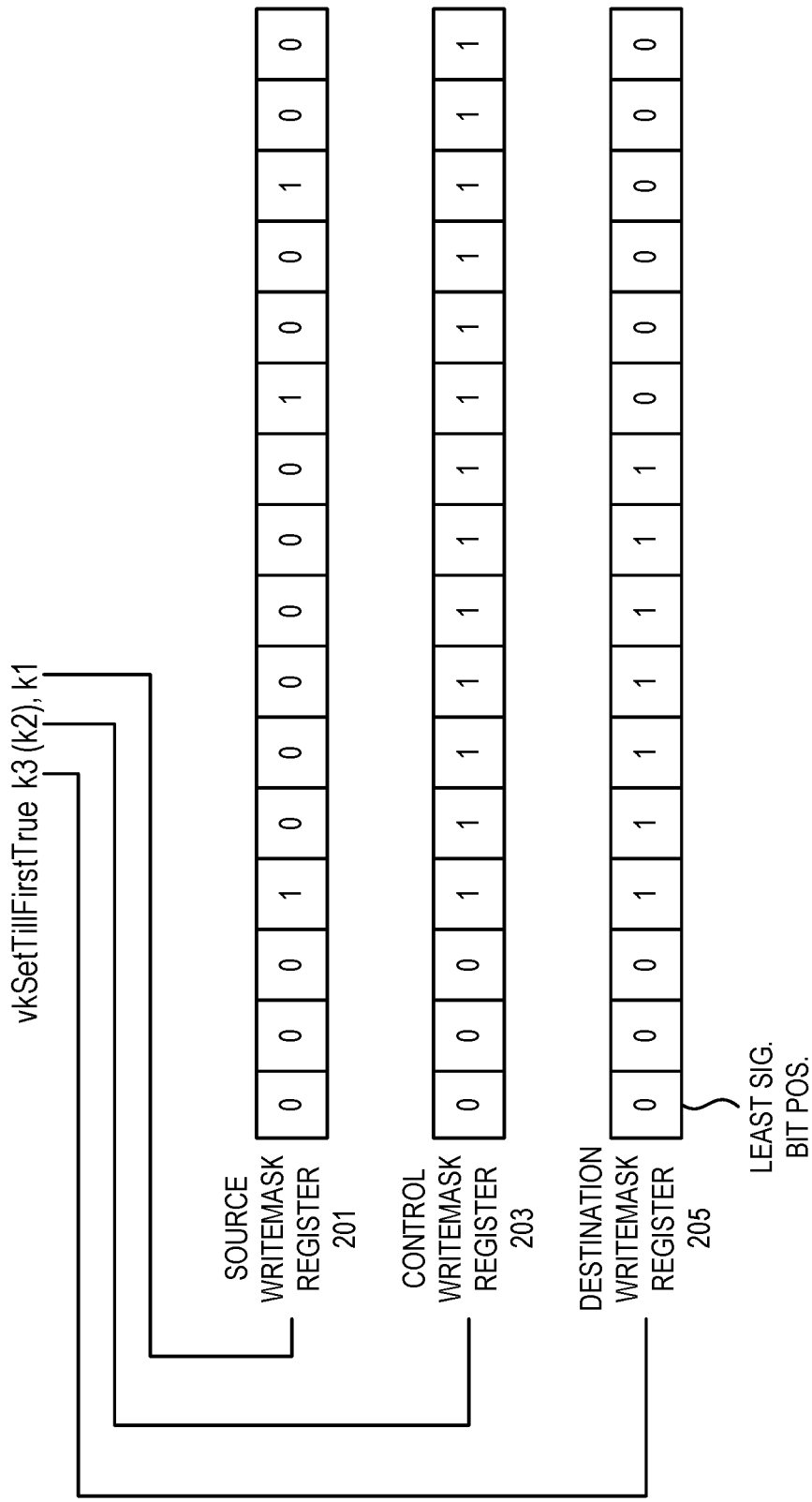
FIG. 2(A) illustrates an example of an operation of vkSetTillFirstTrue that uses a control writemask.

FIG. 2(A) illustrates an example of an operation of vkSetTilFirstTrue that uses a control writemask. Again, in this example, the illustrated writemask registers are arranged such that the least significant bit position is on the left-hand side. This convention is used throughout this document, however, it is not to be taken as the sole way for data to be stored. In fact, these registers typically store data with the least significant bit position to the far right.

The source writemask register 201 shown has 16 active bits. As will be detailed below with respect particular architectures that this instruction may be used in, other register sizes with more or less active bits may be utilized. As illustrated, the first true value (i.e., 1) in the source writemask register 201 is in bit position 3 (the fourth from the left). The control writemask register 203 is also 1 at this bit position. The writemask register's bit positions determine if the data from the source writemask register is to be considered for the purposes of finding the first true or not. If the bit position of the control writemask is 1 then the corresponding data is considered. If not, it is as if the source writemask register's value was a 0. Since the first true in the source writemask register 201 corresponds to the first true of the control writemask register 203, a true value is written into destination writemask register at this position.

The next six bit positions of the source writemask register 201 are 0 and the control writemask 203 at these positions is 1, as such a 1 is written into the corresponding bit positions of the destination writemask register 205. If any bits of the control writemask register 203 had been 0, then a 0 would have been written in the corresponding bit position of the destination writemask register 205.

At bit position 10 of the source writemask register 201, a true (i.e., 1) value is found. The control writemask register 203 value is also 1. As such, a one will not be written into this bit position of the destination and all remaining (more significant) bit positions will be a 0.

Figure 2B:
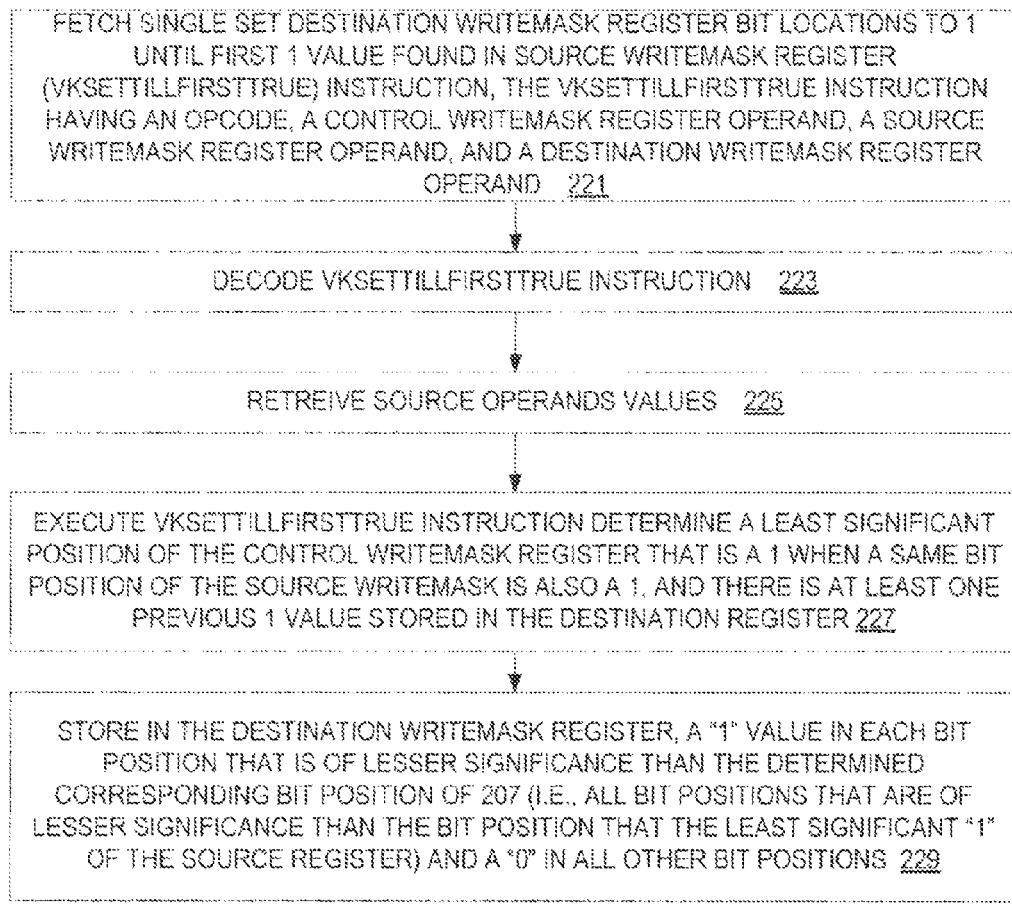
FIG. 2(B) illustrates an embodiment of the use of a vkSetTilFirstTrue with a control writemask register instruction in a processor.

FIG. 2(B) illustrates an embodiment of the use of a vkSetTilFirstTrue with a control writemask register instruction in a processor. A vkSetTilFirstTrue instruction with a destination writemask register operand, a control register operand, opcode and a source writemask register operand is fetched at 221.

The vkSetTilFirstTrue with a control writemask register instruction is decoded by decoding logic at 223. Depending on the instruction's format, a variety of data may be interpreted at this stage such as if there is to be a data transformation, which registers to write to and retrieve, what memory address to access, etc.

The source operand values are retrieved/read at 125. For example, the source writemask register is read.

The vkSetTilFirstTrue with a control writemask register instruction (or operations comprising such an instruction such as microoperations) is executed by execution resources such as one or more functional units at 227 to determine a least significant bit position of the source writemask register that is a true value (i.e., a 1) when the same bit position of the control writemask register is also a 1, and there is at least one previous 1 value stored in the destination register. In the example of FIG. 1(A), this occurs at bit position 10.

A true value (i.e., a 1) is stored in each bit position the destination writemask register that is of lesser significance than the determined corresponding bit position (i.e., all bit positions that are of lesser significance than the bit position than the least significant 1 of the source writemask register) at 229. In some embodiments, a 0 is written to all other bit positions of the destination register at this time.

While 227 and 229 have been illustrated separately, in some embodiments they are performed together as a part of the execution of the instruction.

Figure 2C:
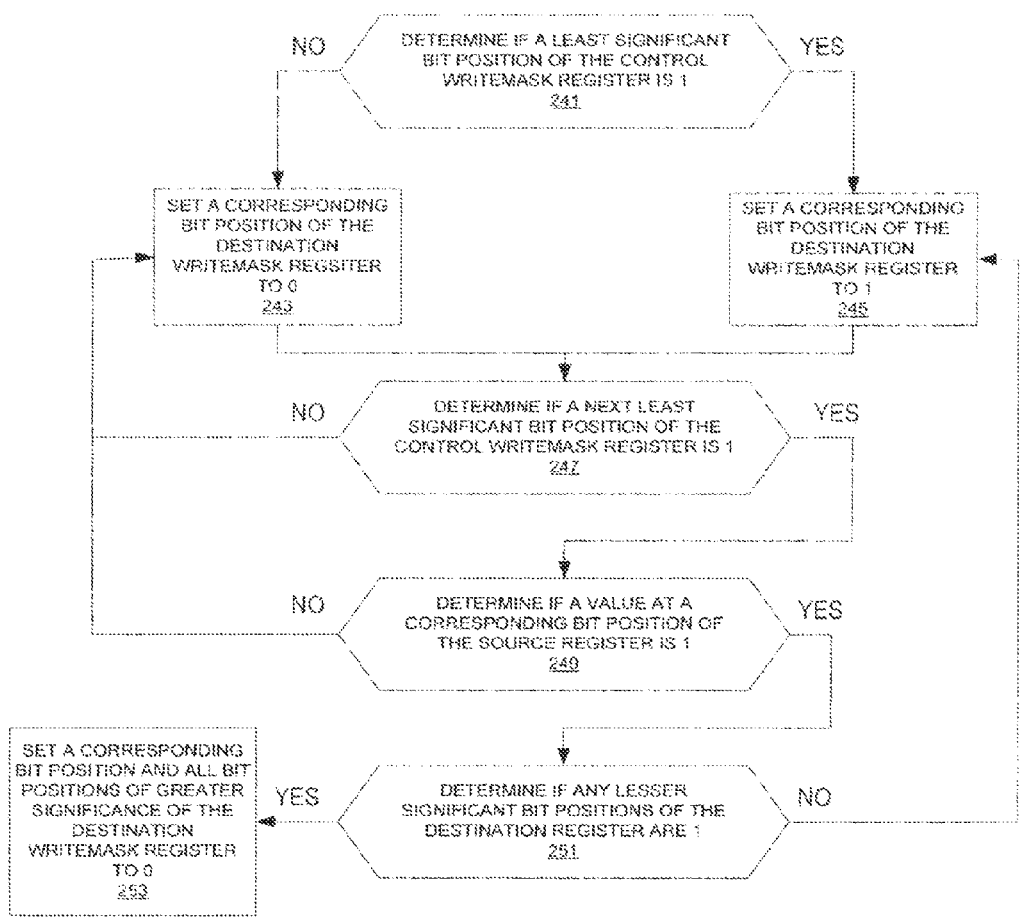
FIG. 2(C) illustrates an embodiment of a method for processing a vkSetTilFirstTrue with a control writemask register instruction that includes a source writemask register, a control register, a destination writemask register, and an opcode.

FIG. 2(C) illustrates an embodiment of a method for processing a vkSetTilFirstTrue with a control writemask register instruction that includes a source writemask register, a control register, a destination writemask register, and an opcode. What is described below occurs after the fetching of the instruction. In some embodiments, prior to any of these operations, all of the bits of the destination writemask register are set to 0.

At 241, a determination of if a least significant bit position of the source writemask register is true (i.e., 1) is made. If yes, then a corresponding bit position of the destination register is set to 1 at 245.

If not, then the corresponding bit position of the destination writemask register is set to false (i.e., 0) at 243. In the example of FIG. 2(A), the determination of 241 was that the value was not true. As such, the least significant bit position of the destination writemask register was set to 0.

A determination of if a next least significant bit position of the control writemask register is 1 is made at 247. If not, then the setting of 243 is performed. If so, then a determination of if any lesser significant bit positions of the destination register have been set to true (i.e., 1) is made at 249. If not, then the setting of 245 is performed.

If so, then this bit position and all bit positions that are of greater significance are set to 0 in the destination register at 253.

Additionally, in some embodiments there are two special instance that may be treated differently. The first such case occurs when the least significant bit of the source writemask register is set to true (i.e., 1), all of the other bits are set to false (i.e., 0), and the control mask and the control mask is all true (i.e., 1). In this scenario the destination writemask register will be set to all true (i.e, 1s) and the control mask and the control mask is all true (i.e., 1). The second case occurs when all bits of the source writemask register are false (i.e., 0). Here, all of the destination writemask register are set to be true (i.e., 1).

FIG. 2(D) illustrates a pseudo-code implementation of this instruction.

An exemplary format of this the above is "vkSetTilFirstTrue k3 {k2}, k1," where k3 is the destination writemask register operand, k1 is the source writemask register operand, k2 is the control writemask register operand (may or may not be used), and vkSetTilFirstTrue is the opcode.

Figure 3A:
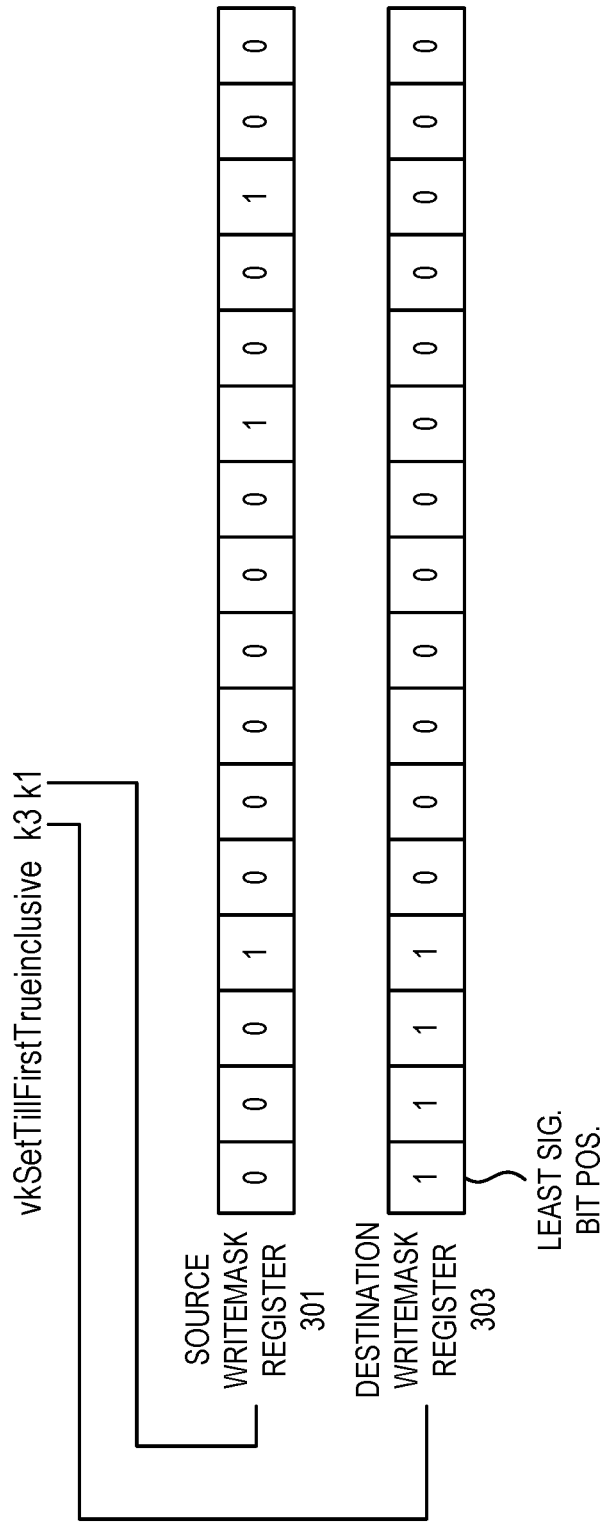
FIG. 3(A) illustrates an example of an operation of vkSetTillFirstTrueInclusive that does not use a control writemask or the control writemask is all set to true.

FIG. 3(A) illustrates an example of an operation of vkSetTillFirstTrueInclusive that does not use a control writemask or the control writemask is all set to true. In this example, the illustrated writemask registers are arranged such that the least significant bit position is on the left-hand side. This convention is used throughout this document, however, it is not to be taken as the sole way for data to be stored. In fact, these registers typically store data with the least significant bit position to the far right.

The source writemask register 301 shown has 16 active bits. As will be detailed below with respect particular architectures that this instruction may be used in, other register sizes with more or less active bits may be utilized. As illustrated, the first true value (i.e., 1) in the source writemask register 101 is in bit position 3 (the fourth from the left). As such, the first four bit positions (0, 1, 2, 3) of the destination writemask register 303 are set to also be true. Bit position 3 of the destination register is set to true because the instruction is inclusive of that bit position. Additionally, in this example as noted above, a control writemask register is either not used or is all 1s. As such, its presence or lack thereof has no impact on the execution of this instruction.

Figure 3B:
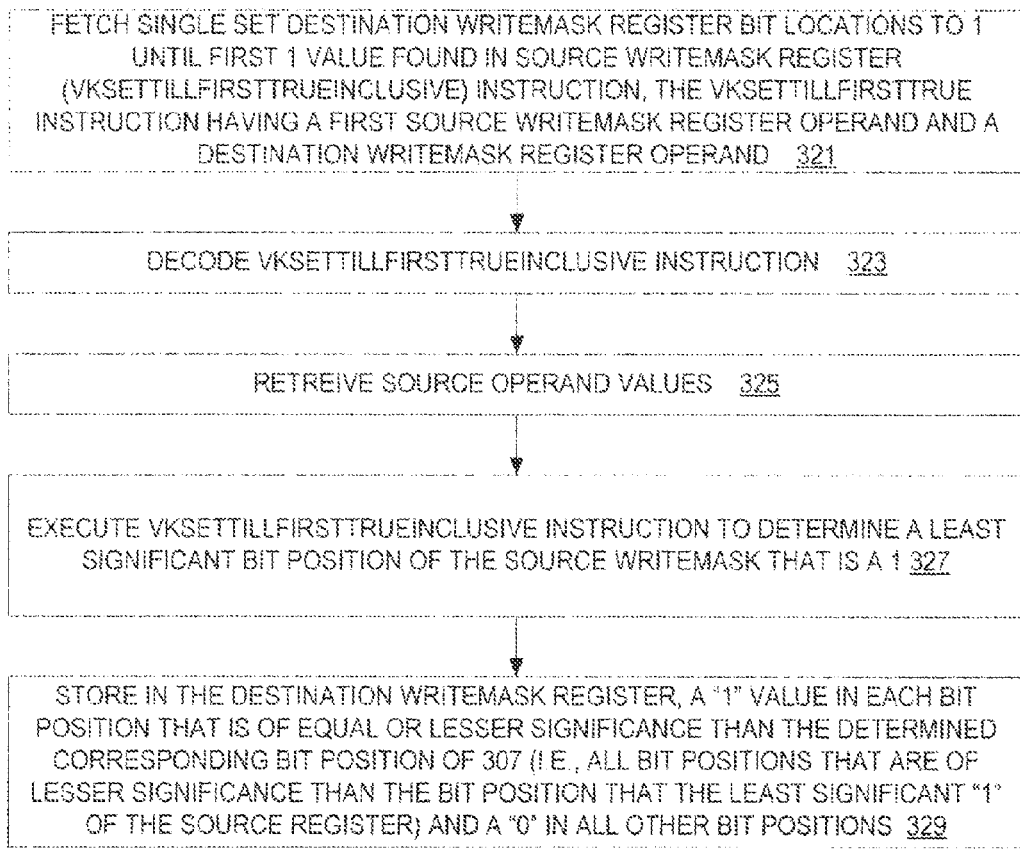
FIG. 3(B) illustrates an embodiment of the use of a vkSetTillFirstTrueInclusive without a control writemask register instruction in a processor.

FIG. 3(B) illustrates an embodiment of the use of a vkSetTillFirstTrueInclusive without a control writemask register instruction in a processor. A vkSetTillFirstTrueInclusive instruction with a destination writemask register operand, opcode, and a source writemask register operand is fetched at 321.

The vkSetTillFirstTrueInclusive instruction is decoded by decoding logic at 323. Depending on the instruction's format, a variety of data may be interpreted at this stage such as if there is to be a data transformation, which registers to write to and retrieve, what memory address to access, etc.

The source operand values are retrieved/read at 325. For example, the source writemask register is read.

The vkSetTillFirstTrueInclusive instruction (or operations comprising such an instruction such as microoperations) is executed by execution resources such as one or more functional units at 327 to determine a least significant bit position of the source writemask register that is a true value (i.e., a 1). In the example of FIG. 3(A), this occurs at bit position 3.

A true value (i.e., a 1) is stored in each bit position the destination writemask register that is of equal or lesser significance than the determined corresponding bit position (i.e., all bit positions that are of equal or lesser significance than the bit position than the least significant 1 of the source writemask register) at 329. In some embodiments, a 0 is written to all other bit positions of the destination register at this time.

While 327 and 329 have been illustrated separately, in some embodiments they are performed together as a part of the execution of the instruction.

Figure 3C:
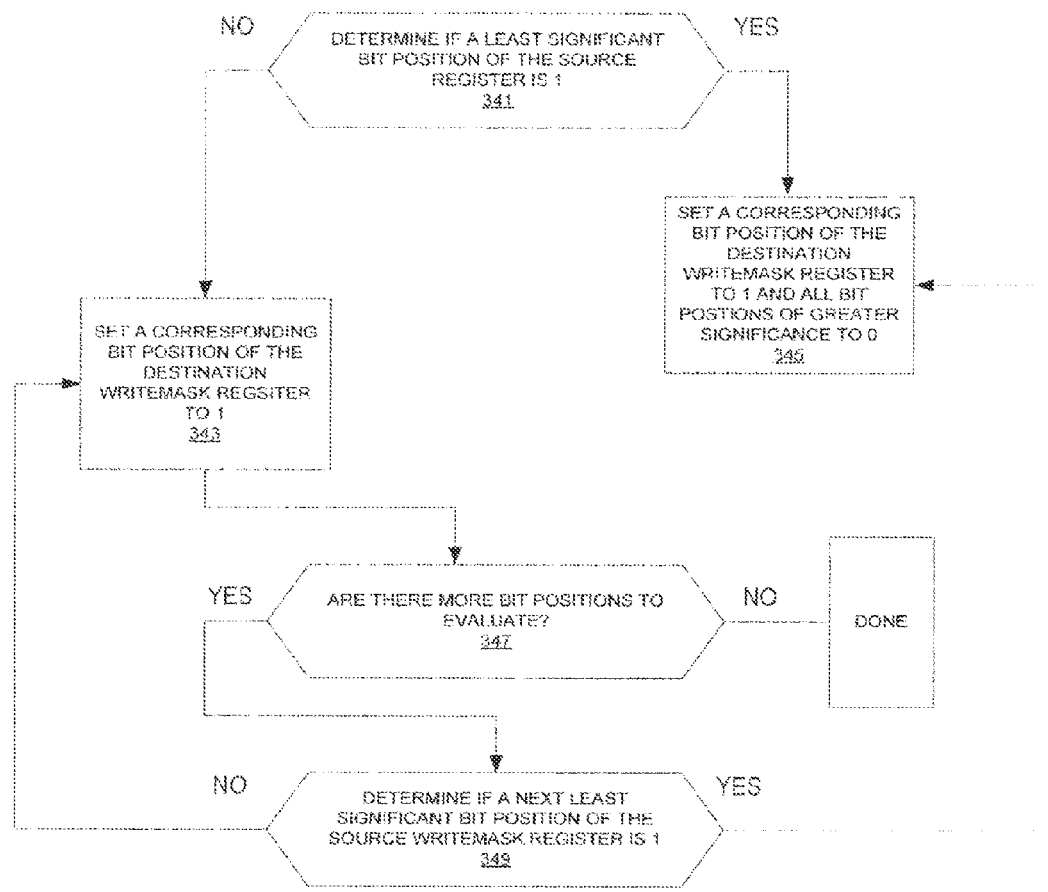
FIG. 3(C) illustrates an embodiment of a method for processing a vkSetTillFirstTrueInclusive instruction that includes a source writemask register, a destination writemask register, and an opcode.

FIG. 3(C) illustrates an embodiment of a method for processing a vkSetTillFirstTrueInclusive instruction that includes a source writemask register, a destination writemask register, and an opcode. What is described below occurs after the fetching of the instruction. In some embodiments, prior to any of these operations, all of the bits of the destination writemask register are set to 0.

At 341, a determination of if a least significant bit position of the source writemask register is true (i.e., 1) is made. If yes, then the least significant bit position of the destination writemask register is set to 1 and all of the other bit positions of the destination writemask are set to false (i.e., zero) at 345 and the instruction is complete.

If not, then the corresponding bit position of the destination writemask register is set to true (i.e., 1) at 343. In the example of FIG. 3(A), the determination of 341 was that the value was not true. As such, the least significant bit position of the destination writemask register was set to 1.

A determination of if there are more bit positions to evaluate may be made at 347. This is not typically done after the least significant bit position has been evaluated, but in some embodiments it occurs at this point. If all of the bit positions that should be evaluated have been evaluated, then the instruction is complete. The number of bit positions to evaluate is typically determined by a vector length.

If there are more bit positions to evaluate, then a determination of if a next least significant bit position of the source writemask register is true (i.e., 1) is made at 349. In the example of FIG. 3(A), this would be bit position 1 at this point in the method. If yes, the method goes to step 345 and if no, it goes to step 343.

Figure 4A:
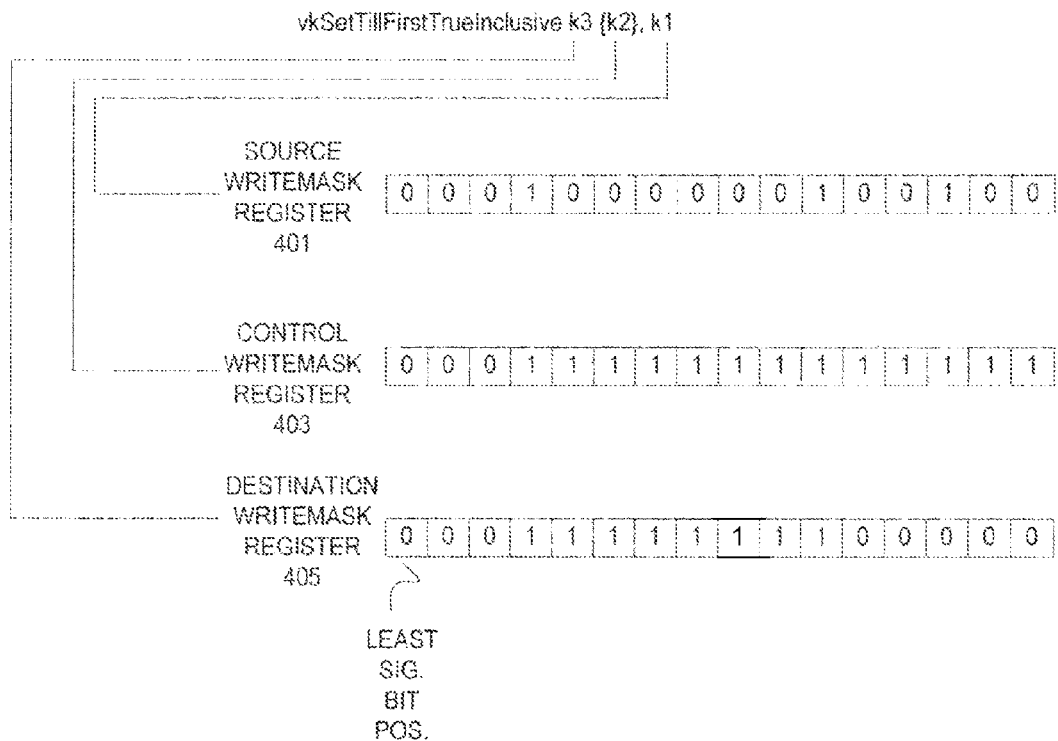
FIG. 4(A) illustrates an example of an operation of vkSetTillFirstTrueInclusive that uses a control writemask.

FIG. 4(A) illustrates an example of an operation of vkSetTillFirstTrueInclusive that uses a control writemask. Again, in this example, the illustrated writemask registers are arranged such that the least significant bit position is on the left-hand side. This convention is used throughout this document, however, it is not to be taken as the sole way for data to be stored. In fact, these registers typically store data with the least significant bit position to the far right.

The source writemask register 401 shown has 16 active bits. As will be detailed below with respect particular architectures that this instruction may be used in, other register sizes with more or less active bits may be utilized. As illustrated, the first true value (i.e., 1) in the source writemask register 401 is in bit position 3 (the fourth from the left). The control writemask register 403 is also 1 at this bit position. The writemask register's bit positions determine if the data from the source writemask register is to be considered for the purposes of finding the first true or not. If the bit position of the control writemask is 1 then the corresponding data is considered. If not, it is as if the source writemask register's value was a 0. Since the first true in the source writemask register 401 corresponds to the first true of the control writemask register 403, a true value is written into destination writemask register at this position.

The next six bit positions of the source writemask register 401 are 0 and the control writemask 403 are 1, as such a 1 is written into the corresponding bit positions of the destination writemask register 405. If any bits of the control writemask register 403 had been 0, then a 0 would have been written in the corresponding bit position of the destination writemask register 405.

At bit position 10 of the source writemask register 401, a true (i.e., 1) value is found. The control writemask register 403 value is also 1. As such, a 1 will be written into this bit position of the destination and all remaining (more significant) bit positions will be a 0.

Figure 4B:
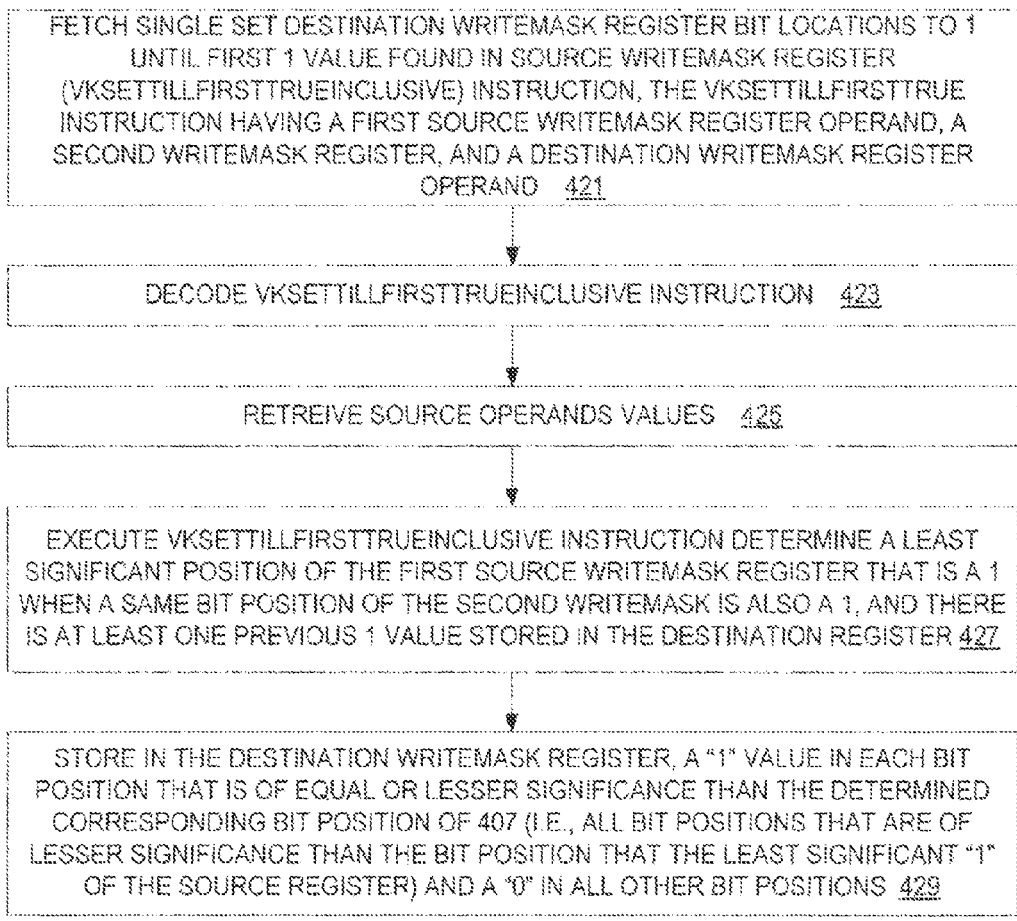
FIG. 4(B) illustrates an embodiment of the use of a vkSetTillFirstTrueInclusive with a control writemask register instruction in a processor.

FIG. 4(B) illustrates an embodiment of the use of a vkSetTillFirstTrueInclusive with a control writemask register instruction in a processor. A vkSetTillFirstTrueInclusive instruction with a destination writemask register operand, a control register operand, opcode and a source writemask register operand is fetched at 421.

The vkSetTillFirstTrueInclusive with a control writemask register instruction is decoded by decoding logic at 423. Depending on the instruction's format, a variety of data may be interpreted at this stage such as if there is to be a data transformation, which registers to write to and retrieve, what memory address to access, etc.

The source operand values are retrieved/read at 425. For example, the source writemask register is read.

The vkSetTillFirstTrueInclusive with a control writemask register instruction (or operations comprising such an instruction such as microoperations) is executed by execution resources such as one or more functional units at 427 to determine a least significant bit position of the source writemask register that is a true value (i.e., a 1) when the same bit position of the control writemask register is also a 1, and there is at least one previous 1 value stored in the destination register. In the example of FIG. 4(A), this occurs at bit position 10.

A true value (i.e., a 1) is stored in each bit position the destination writemask register that is or equal or lesser significance than the determined corresponding bit position (i.e., all bit positions that are of lesser significance than the bit position than the least significant 1 of the source writemask register) at 429. In some embodiments, a 0 is written to all other bit positions of the destination register at this time.

While 427 and 429 have been illustrated separately, in some embodiments they are performed together as a part of the execution of the instruction.

Figure 4C:
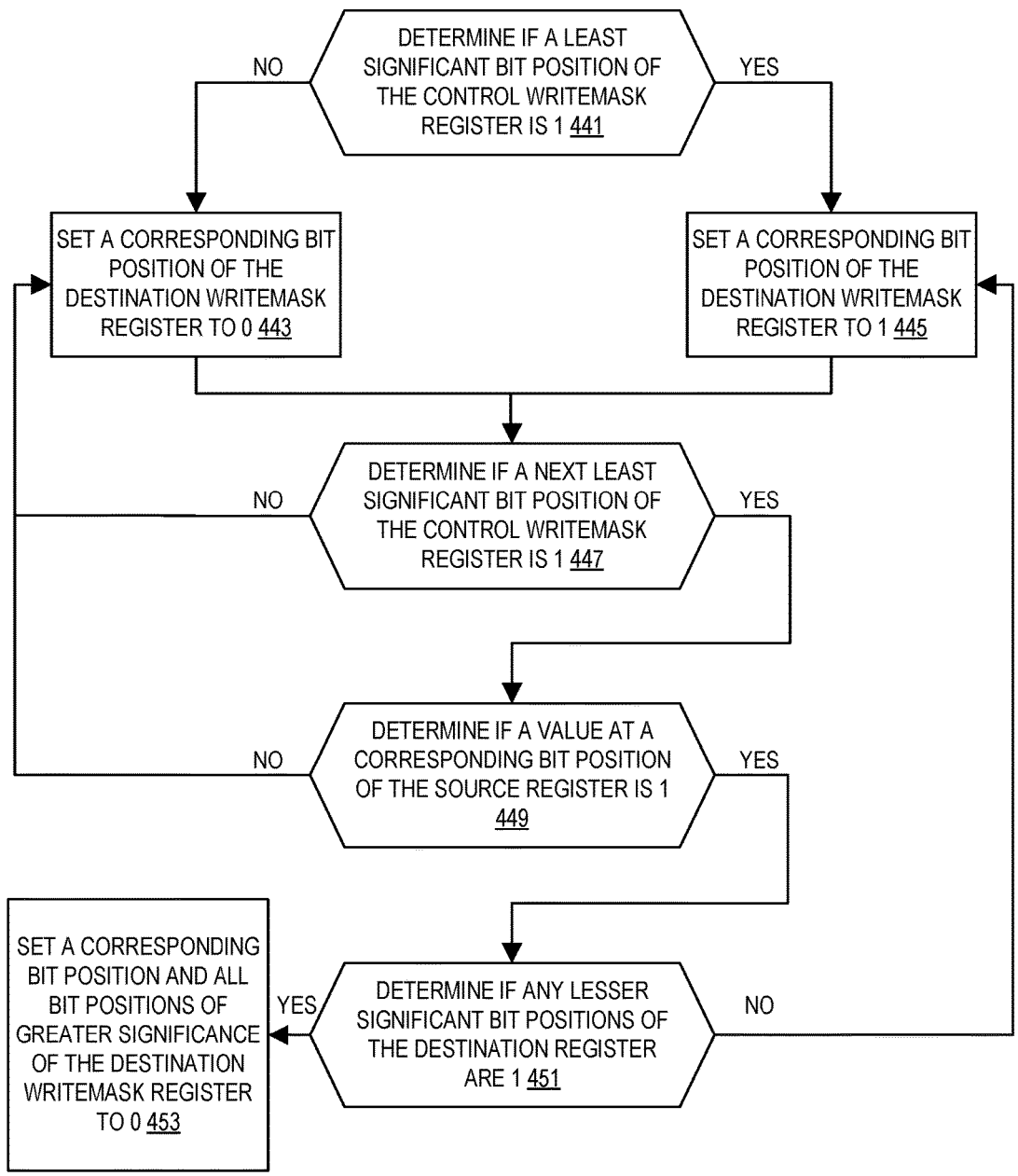
FIG. 4(C) illustrates an embodiment of a method for processing a vkSetTillFirstTrueInclusive with a control writemask register instruction that includes a source writemask register, a control register, a destination writemask register, and an opcode.

FIG. 4(C) illustrates an embodiment of a method for processing a vkSetTillFirstTrueInclusive with a control writemask register instruction that includes a source writemask register, a control register, a destination writemask register, and an opcode. What is described below occurs after the fetching of the instruction. In some embodiments, prior to any of these operations, all of the bits of the destination writemask register are set to 0.

At 441, a determination of if a least significant bit position of the source writemask register is true (i.e., 1) is made. If yes, then a corresponding bit position of the destination register is set to 1 at 445.

If not, then the corresponding bit position of the destination writemask register is set to false (i.e., 0) at 443. In the example of FIG. 4(A), the determination of 441 was that the value was not true. As such, the least significant bit position of the destination writemask register was set to 0.

A determination of if a next least significant bit position of the control writemask register is 1 is made at 447. If not, then the setting of 443 is performed. If so, then a determination of if any lesser significant bit positions of the destination register have been set to true (i.e., 1) is made at 449. If not, then the setting of 445 is performed.

If so, then this bit position is set to 1 and all bit positions that are of greater significance are set to 0 in the destination register at 451.

FIG. 4(D) illustrates a pseudo-code implementation of this instruction.

Figure 4E:
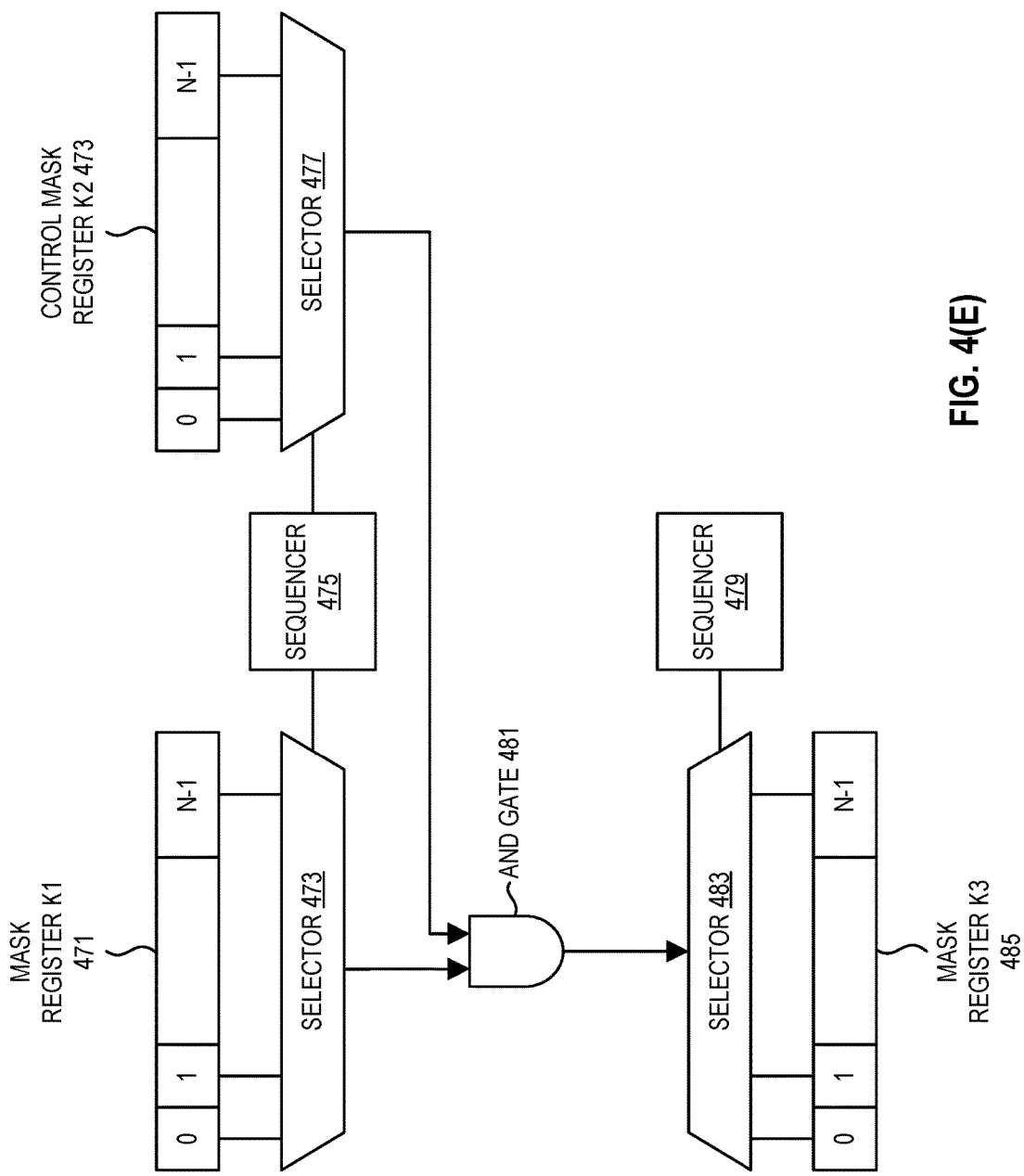
FIG. 4(E) illustrates an exemplary hardware scheme for implementing these instructions.

FIG. 4(E) illustrates an exemplary hardware scheme for implementing these instructions. A source mask register 471 and control mask register 473 are shown. A selector 473, 477 per register is used to select the proper bit position's data from those registers. A sequencer 475 is used to step through these registers in order.

An AND gate 481 is used to logically AND the output of both selectors. As detailed above, the control mask determines if the source mask bit is to be considered. If the result of the ANDing is 0 then the source mask bit is not considered.

A selector 483 is used to feed the destination mask register 485 according to the sequencer 479's input.

An exemplary format of this the above is "vkSetTilFirstTrueInclusive k3 {k2}, k1," where k3 is the destination writemask register operand, k1 is the source writemask register operand, k2 is the control writemask register operand (may or may not be used), and vkSetTilFirstTrueInclusive is the opcode.

The second two instructions are vkSetTillTruePair{Inclusive} instructions which provide additional functionality to the vkSetTillFirstTrue{Inclusive} instructions. These instructions set a destination writemask register (k4) based on an input writemask register pair (k1 and k2) subject to control writemask register (k3). Bits of k4 are set to "true" until the first "true" bit position in k1 seen after observing the first "true" bit in k2. The bit in k4 corresponding to this first "true" bit in k1 and all following bits are set to "false" in the non-inclusive instruction. The two instructions differ in whether the bit corresponding to a true condition (in mask k1) is set at the output mask (k4) or not. The non-inclusive version is generally described with respect FIG. 5 (including the sub parts) and the inclusive version is generally described with respect to FIG. 6 (including the sub parts).

Figure 5A:
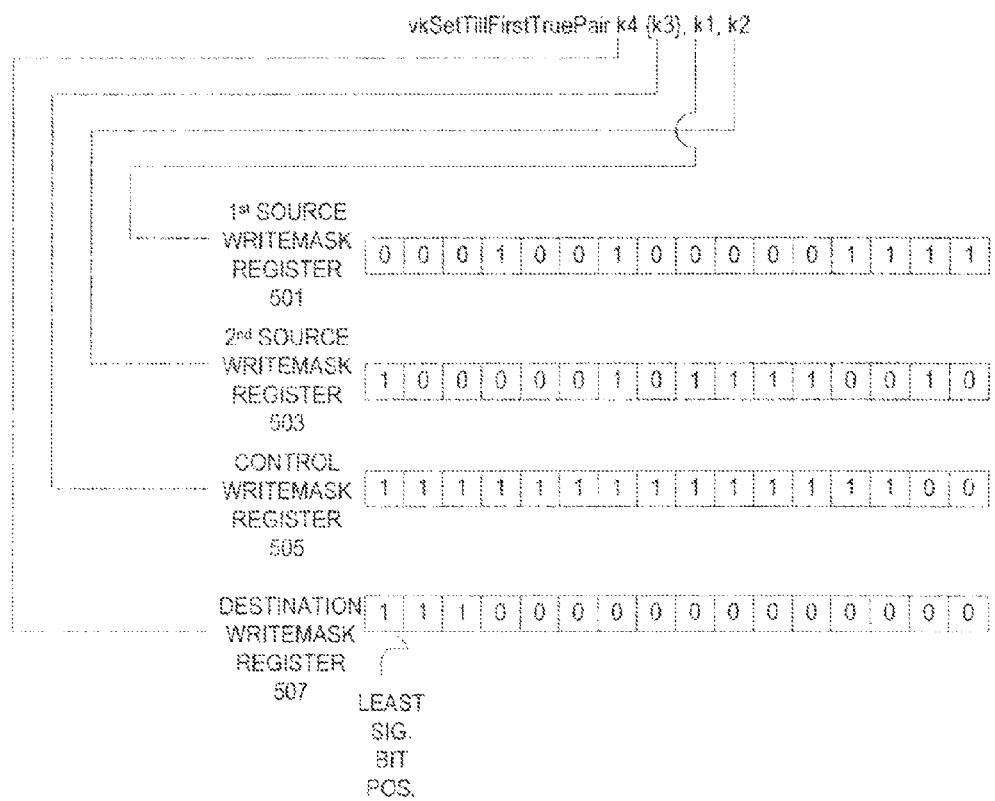
FIG. 5(A) illustrates an example of an operation of vkSetTillTruePair.

FIG. 5(A) illustrates an example of an operation of vkSetTillTruePair. In this example, the illustrated writemask registers are arranged such that the least significant bit position is on the left-hand side. This convention is used throughout this document, however, it is not to be taken as the sole way for data to be stored. In fact, these registers typically store data with the least significant bit position to the far right.

The first source writemask register 501 shown has 16 active bits. As will be detailed below with respect particular architectures that this instruction may be used in, other register sizes with more or less active bits may be utilized. As illustrated, the first true value when the control writemask register 505 is true (i.e., 1) in the first source writemask register 501 is in bit position 3 (the fourth from the left). The first true value when the control writemask register 505 is true (i.e., 1) in the second source writemask register 503 is in bit position 0 (the first from the left).

As such, the first three bit positions (0, 1, 2) of the destination writemask register 505 are set to also be true. Bit position 3 of the destination register is not set to true because the instruction is not inclusive of that bit position.

Figure 5B:
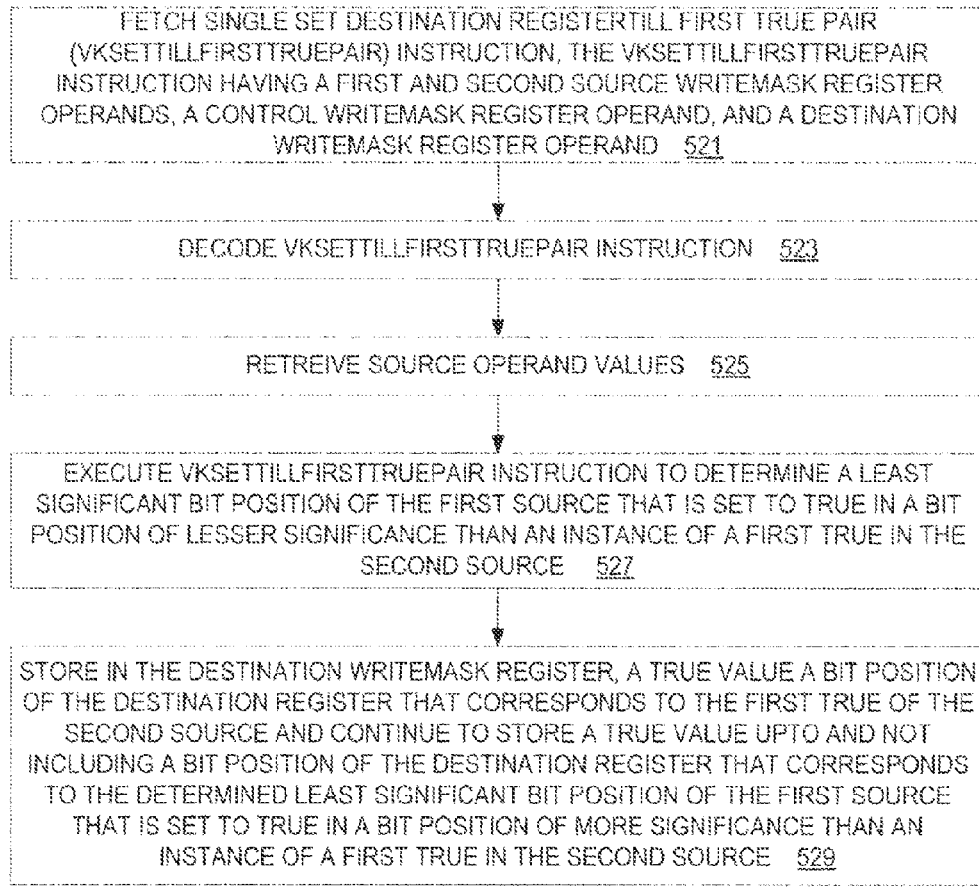
FIG. 5(B) illustrates an embodiment of the use of a vkSetTillTruePair instruction in a processor.

FIG. 5(B) illustrates an embodiment of the use of a vkSetTillTruePair instruction in a processor. A vkSetTillTruePair instruction with a destination writemask register operand, opcode, a first and second source writemask register operand, and a control writemask register operand is fetched at 521.

The vkSetTillTruePair instruction is decoded by decoding logic at 523. Depending on the instruction's format, a variety of data may be interpreted at this stage such as if there is to be a data transformation, which registers to write to and retrieve, what memory address to access, etc.

The source operand values are retrieved/read at 525. For example, the source writemask register is read.

The vkSetTillTruePair instruction (or operations comprising such an instruction such as microoperations) is executed by execution resources such as one or more functional units at 527 to determine a least significant bit position of the first source writemask register that is a true value (i.e., a 1) in a bit position of more significance than an instance of a first true in the second source subject to the control register. In the example of FIG. 5(A), this occurs at bit position 3.

A true value (i.e., a 1) is stored in each bit position the destination writemask register that is lesser significance than the determined corresponding bit position (i.e., all bit positions that are of lesser significance than the bit position than the determined least significant 1 of the source writemask register according to the conditions above) at 529. In some embodiments, a 0 is written to all other bit positions of the destination register at this time.

While 527 and 529 have been illustrated separately, in some embodiments they are performed together as a part of the execution of the instruction.

Figure 5C:
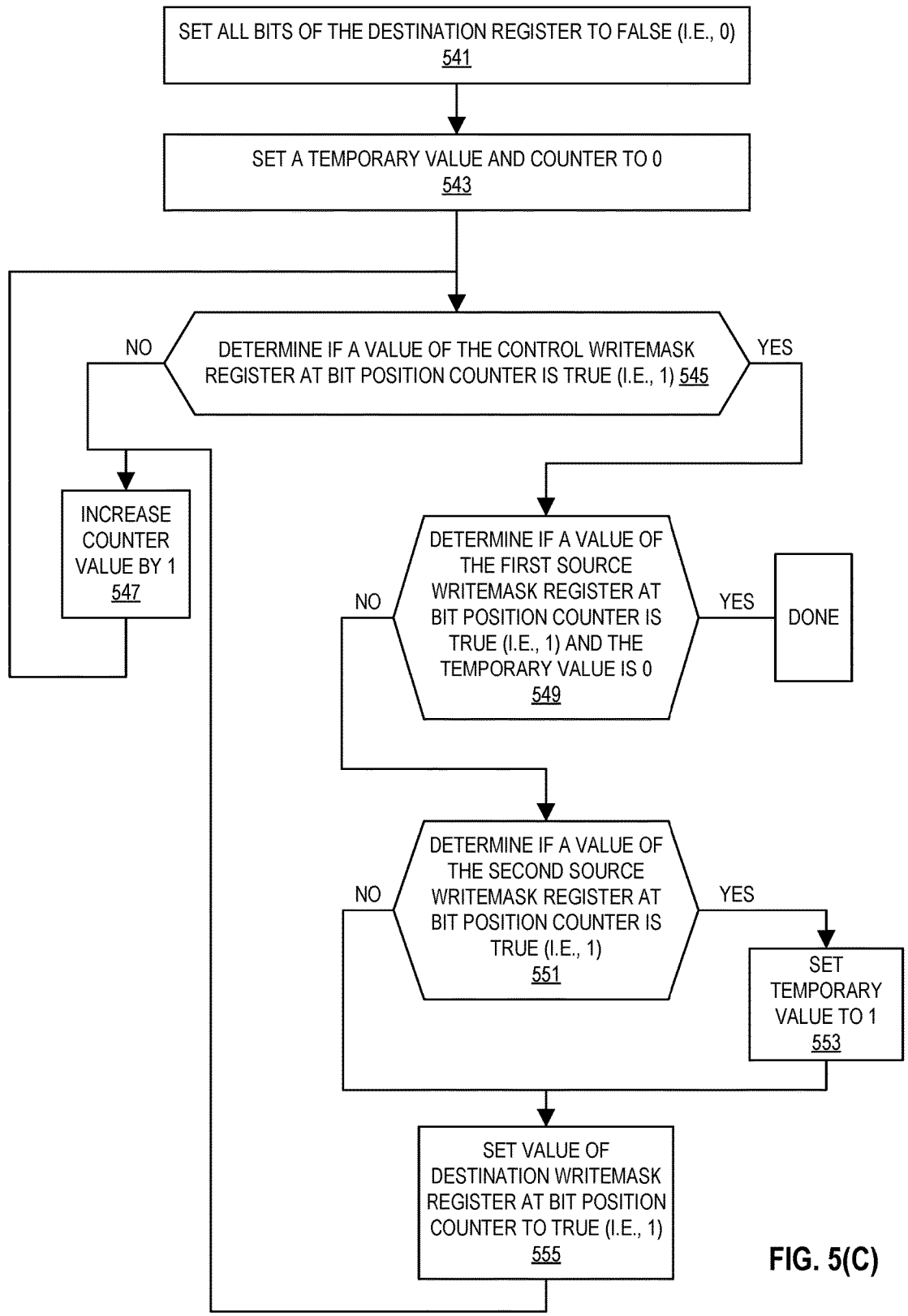
FIG. 5(C) illustrates an embodiment of a method for processing a vkSetTillTruePair instruction that includes a first and second source writemask register, control writemask register, a destination writemask register, and an opcode.

FIG. 5(C) illustrates an embodiment of a method for processing a vkSetTillTruePair instruction that includes a first and second source writemask register, control writemask register, a destination writemask register, and an opcode. What is described below occurs after the fetching of the instruction. In some embodiments, prior to any of these operations, all of the bits of the destination writemask register are set to 0.

In some embodiments, all of the bits of the destination register are set to false (i.e., 0) at 541. A temporary value and a counter value are both set to 0 at 543.

At 545, a determination of if a least significant bit position of the control writemask register at bit position counter is true (i.e., 1) is made. If no, the counter value is increased by 1 at 547 followed by another determination of step 545 for that new bit position.

If yes, then a determination of if a value of the first source writemask register at bit position counter is true (i.e., 1) and the temporary value is 0 is made at 549. If yes, then the instruction has completed.

If not, then a determination of if a value of the second source writemask register at bit position counter is true (i.e., 1) is made at 551. If yes, then the temporary value is set to 1 to indicate that a true value has been found in the second source at 553.

If not, or after the temporary value is set to 1, the value of the destination writemask register at bit position is set to true (i.e., 1) at 555 and the counter is increased by 1 at 547.

FIG. 5(D) illustrates a pseudo-code implementation of this instruction.

Figure 6A:
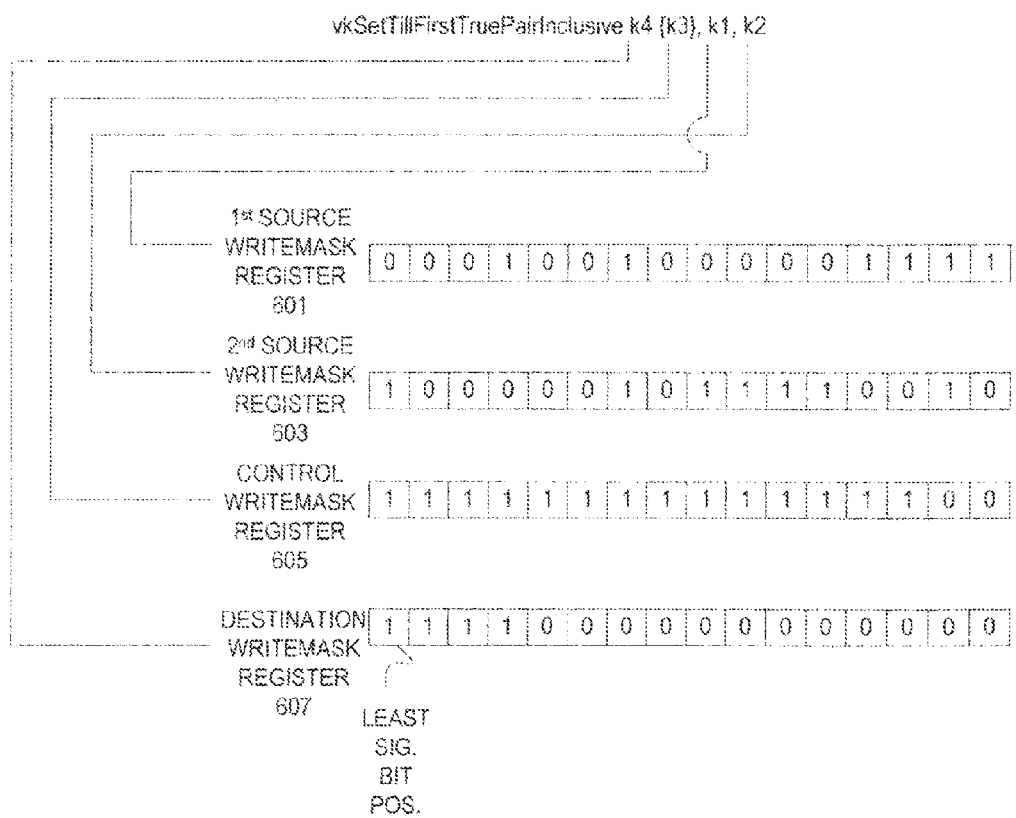
FIG. 6(A) illustrates an example of an operation of vkSetTillTruePairInclusive.

FIG. 6(A) illustrates an example of an operation of vkSetTillTruePairInclusive. In this example, the illustrated writemask registers are arranged such that the least significant bit position is on the left-hand side. This convention is used throughout this document, however, it is not to be taken as the sole way for data to be stored. In fact, these registers typically store data with the least significant bit position to the far right.

The first source writemask register 601 shown has 16 active bits. As will be detailed below with respect particular architectures that this instruction may be used in, other register sizes with more or less active bits may be utilized. As illustrated, the first true value when the control writemask register 605 is true (i.e., 1) in the first source writemask register 601 is in bit position 3 (the fourth from the left). The first true value when the control writemask register 605 is true (i.e., 1) in the second source writemask register 603 is in bit position 0 (the first from the left).

As such, the first four bit positions (0, 1, 2, 3) of the destination writemask register 605 are set to also be true. Bit position 3 of the destination register is set to true because the instruction is inclusive of that bit position.

Figure 6B:
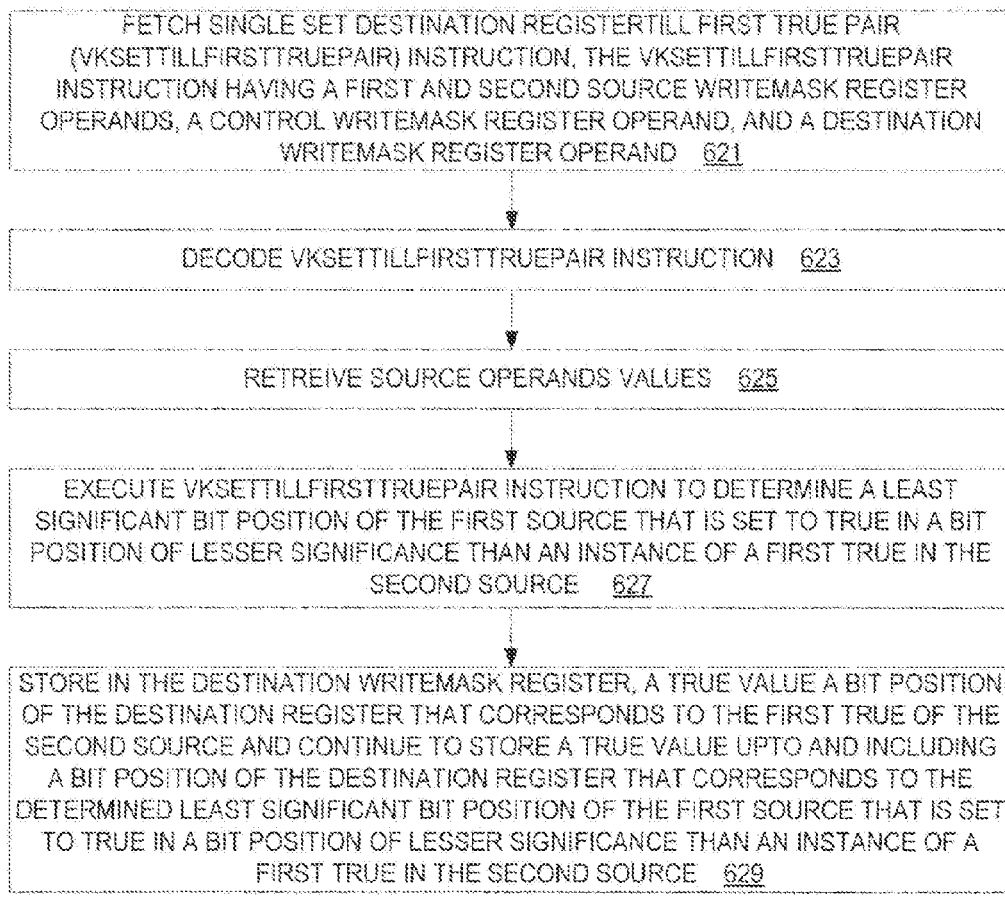
FIG. 6(B) illustrates an embodiment of the use of a vkSetTillTruePairInclusive instruction in a processor.

FIG. 6(B) illustrates an embodiment of the use of a vkSetTillTruePairInclusive instruction in a processor. A vkSetTillTruePairInclusive instruction with a destination writemask register operand, opcode, a first and second source writemask register operand, and a control writemask register operand is fetched at 621.

The vkSetTillTruePairInclusive instruction is decoded by decoding logic at 623. Depending on the instruction's format, a variety of data may be interpreted at this stage such as if there is to be a data transformation, which registers to write to and retrieve, what memory address to access, etc.

The source operand values are retrieved/read at 625. For example, the source writemask register is read.

The vkSetTillTruePairInclusive instruction (or operations comprising such an instruction such as microoperations) is executed by execution resources such as one or more functional units at 627 to determine a least significant bit position of the first source writemask register that is a true value (i.e., a 1) in a bit position of more significance than an instance of a first true in the second source subject to the control register. In the example of FIG. 6(A), this occurs at bit position 3.

A true value (i.e., a 1) is stored in each bit position the destination writemask register that is of equal or lesser significance than the determined corresponding bit position (i.e., all bit positions that are of lesser significance than the bit position than the determined least significant 1 of the source writemask register according to the conditions above) at 629. In some embodiments, a 0 is written to all other bit positions of the destination register at this time.

While 627 and 629 have been illustrated separately, in some embodiments they are performed together as a part of the execution of the instruction.

Figure 6C:
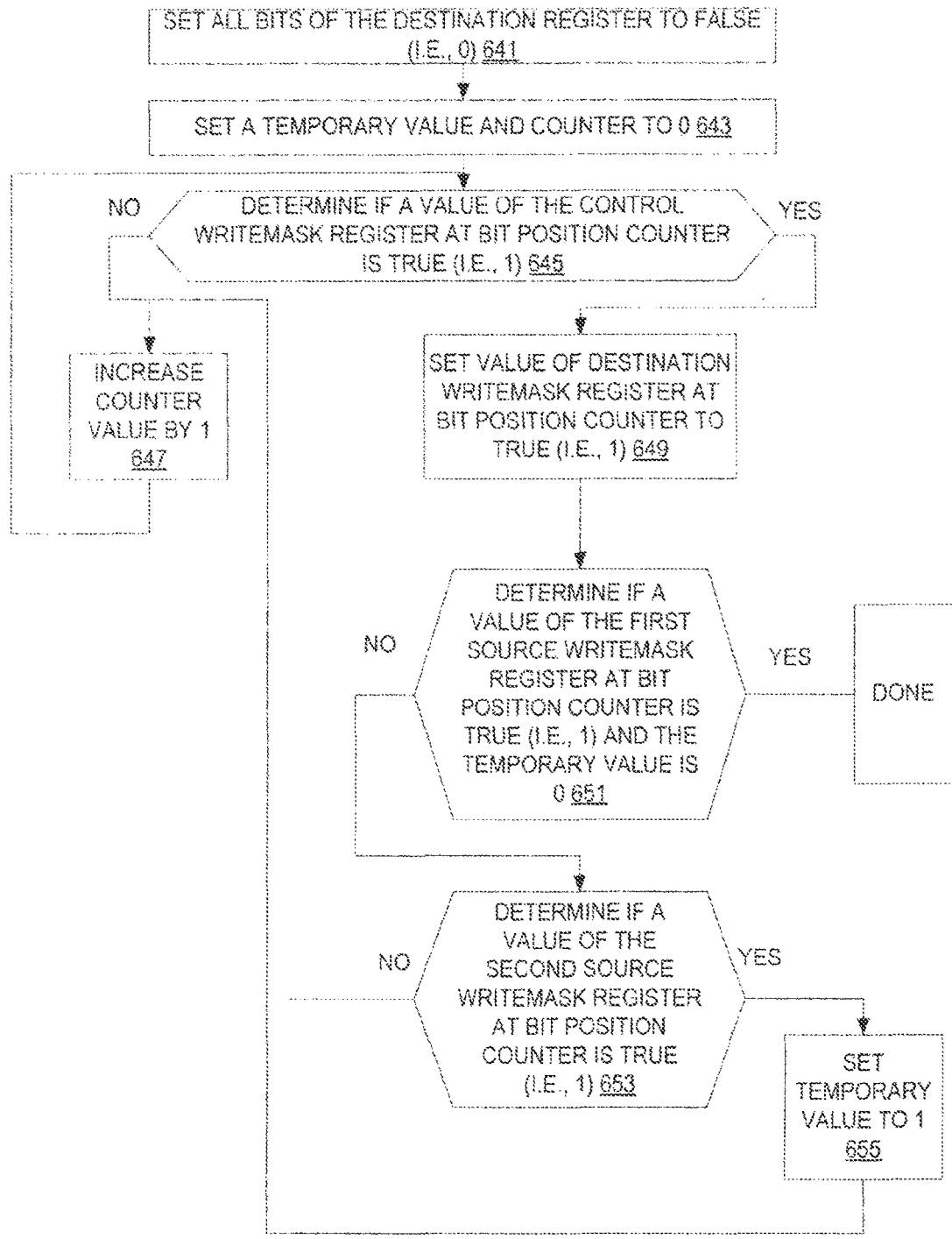
FIG. 6(C) illustrates an embodiment of a method for processing a vkSetTillTruePair instruction that includes a first and second source writemask register, control writemask register, a destination writemask register, and an opcode.

FIG. 6(C) illustrates an embodiment of a method for processing a vkSetTillTruePair instruction that includes a first and second source writemask register, control writemask register, a destination writemask register, and an opcode. What is described below occurs after the fetching of the instruction. In some embodiments, prior to any of these operations, all of the bits of the destination writemask register are set to 0.

In some embodiments, all of the bits of the destination register are set to false (i.e., 0) at 641. A temporary value and a counter value are both set to 0 at 643.

At 645, a determination of if a least significant bit position of the control writemask register at bit position counter is true (i.e., 1) is made. If no, the counter value is increased by 1 at 647 followed by another determination of step 645 for that new bit position.

If yes, then a value of the destination writemask register at bit position counter is set to true (i.e., 1) at 649.

A determination of if a value of the first source writemask register at bit position counter is true (i.e., 1) and the temporary value is 0 is made at 651. If yes, then the instruction has completed.

If not, then a determination of if a value of the second source writemask register at bit position counter is true (i.e., 1) is made at 653. If yes, then the temporary value is set to 1 to indicate that a true value has been found in the second source at 655.

If not, or after the temporary value is set to 1, the counter is increased by 1 at 647.

FIG. 6(D) illustrates a pseudo-code implementation of this instruction.

Figure 6E:
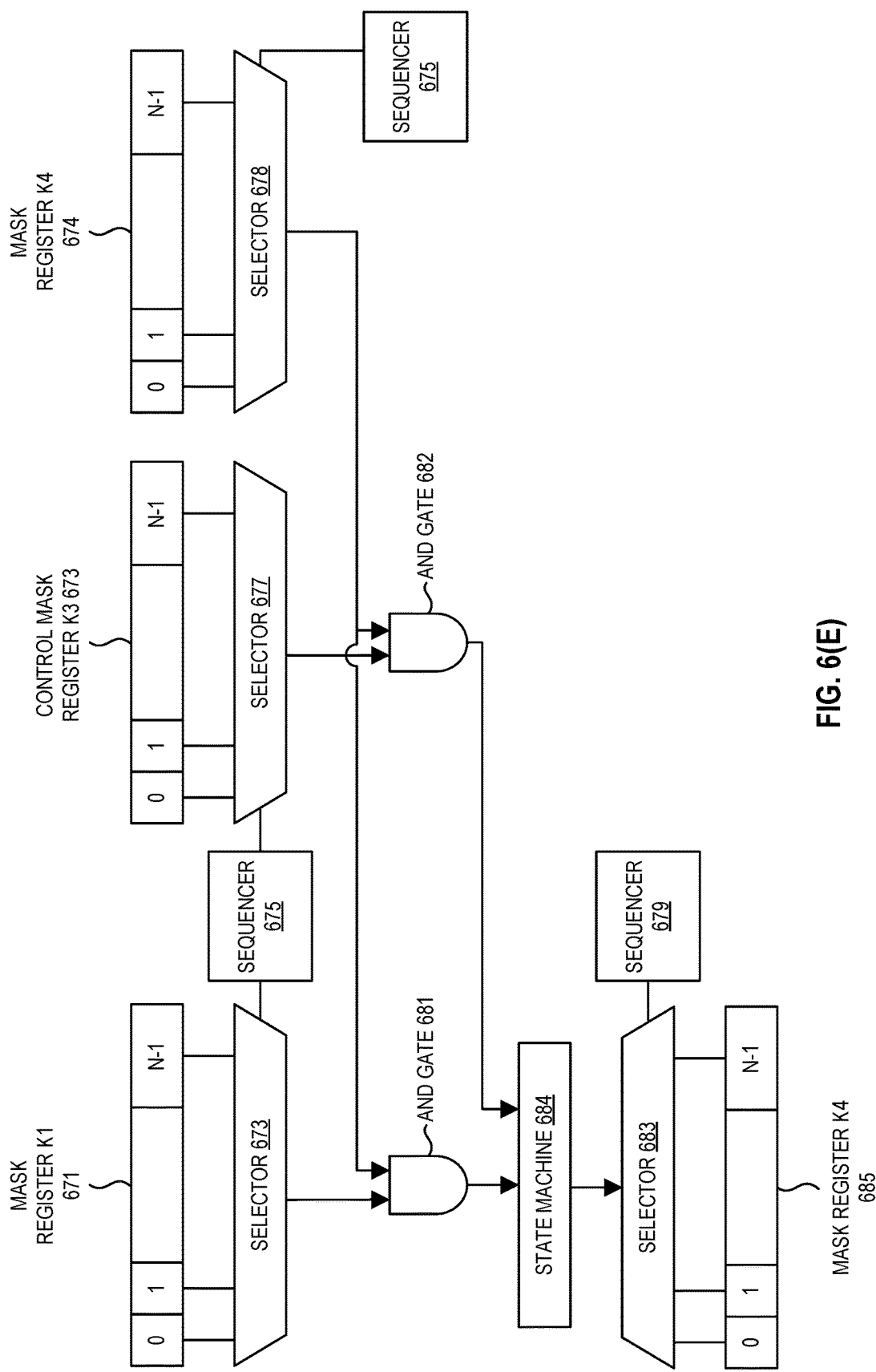
FIG. 6(E) illustrates an exemplary hardware scheme for implementing these instructions.

FIG. 6(E) illustrates an exemplary hardware scheme for implementing these instructions. First and second source mask registers 671, 674 and a control mask register 673 are shown. Selectors 673, 677, 678 per register are used to select the proper bit position's data from those registers. Sequencers 675, 676 are used to step through these registers in order.

An AND gate 681 is used to logically AND the output of selectors 673 and 678. Similarly, AND gate 682 is used to logically AND the output of selectors 677 and 678. As detailed above, the control mask determines if the source mask bit is to be considered. If the result of the ANDing is 0 then the source mask bit is not considered. The outputs of the AND gates 681, 682 are provided to a state machine 684 which makes the determinations discussed above.

A selector 683 is used to feed the destination mask register 685 according to the sequencer 679's input.

An exemplary format of this the above is "vkSetTilFirstTruePair k4 {k3}, k1, k2," where k4 is the destination writemask register operand, k1 and k2 are the source writemask register operands, k3 is the control writemask register operand, and vkSetTilFirstTruePair is the opcode.

Exemplary Instruction Formats

Embodiments of the instruction(s) described herein may be embodied in different formats such as a generic vector friendly format. Additionally, exemplary systems, architectures, and pipelines are detailed below. Embodiments of the instruction(s) may be executed on such systems, architectures, and pipelines, but are not limited to those detailed.

Generic Vector Friendly Instruction Format

A vector friendly instruction format is an instruction format that is suited for vector instructions (e.g., there are certain fields specific to vector operations). While embodiments are described in which both vector and scalar operations are supported through the vector friendly instruction format, alternative embodiments use only vector operations the vector friendly instruction format.

Figure 8A:
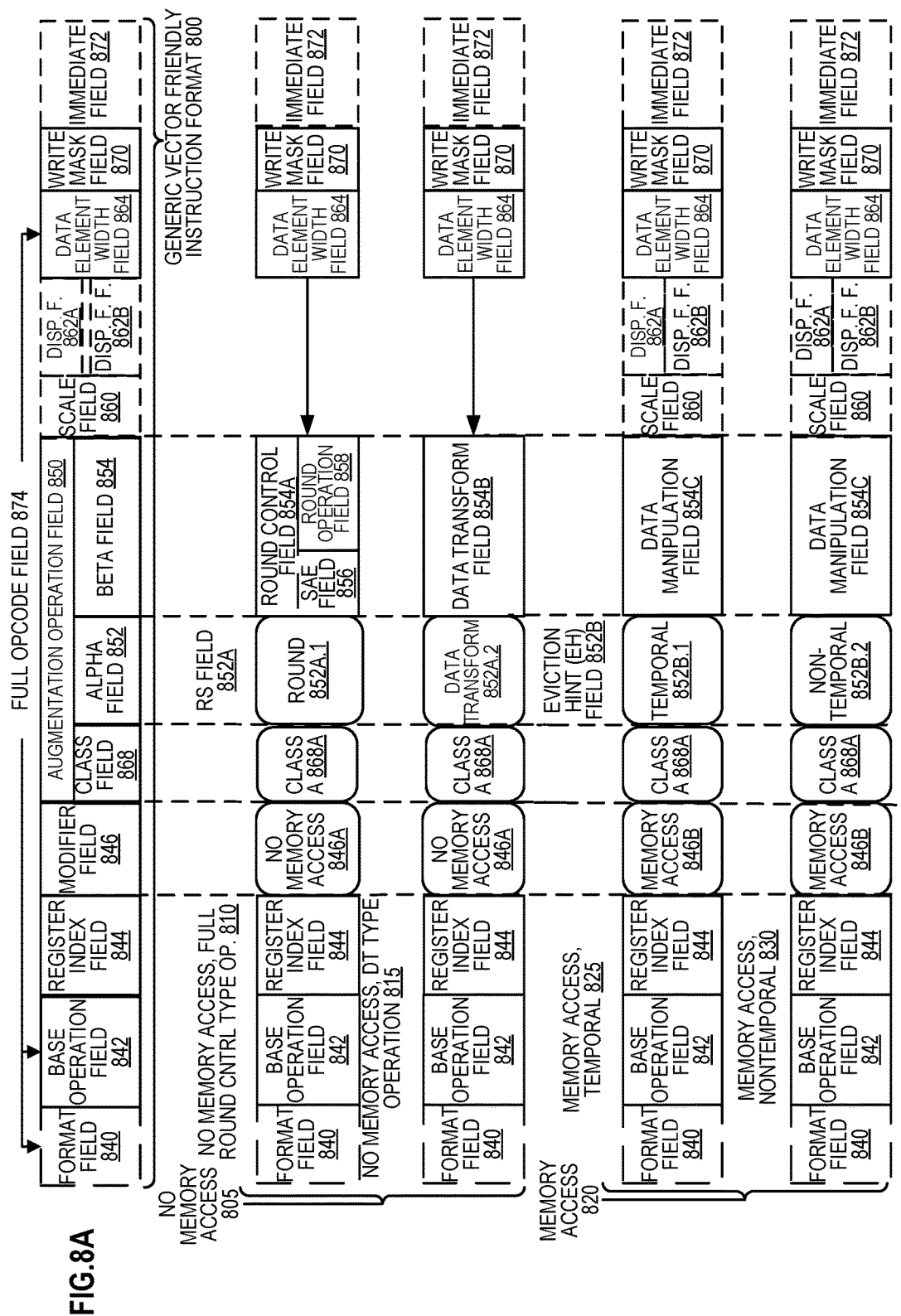
FIGS. 8A-8B are block diagrams illustrating a generic vector friendly instruction format and instruction templates thereof according to embodiments of the invention.
Figure 8B:
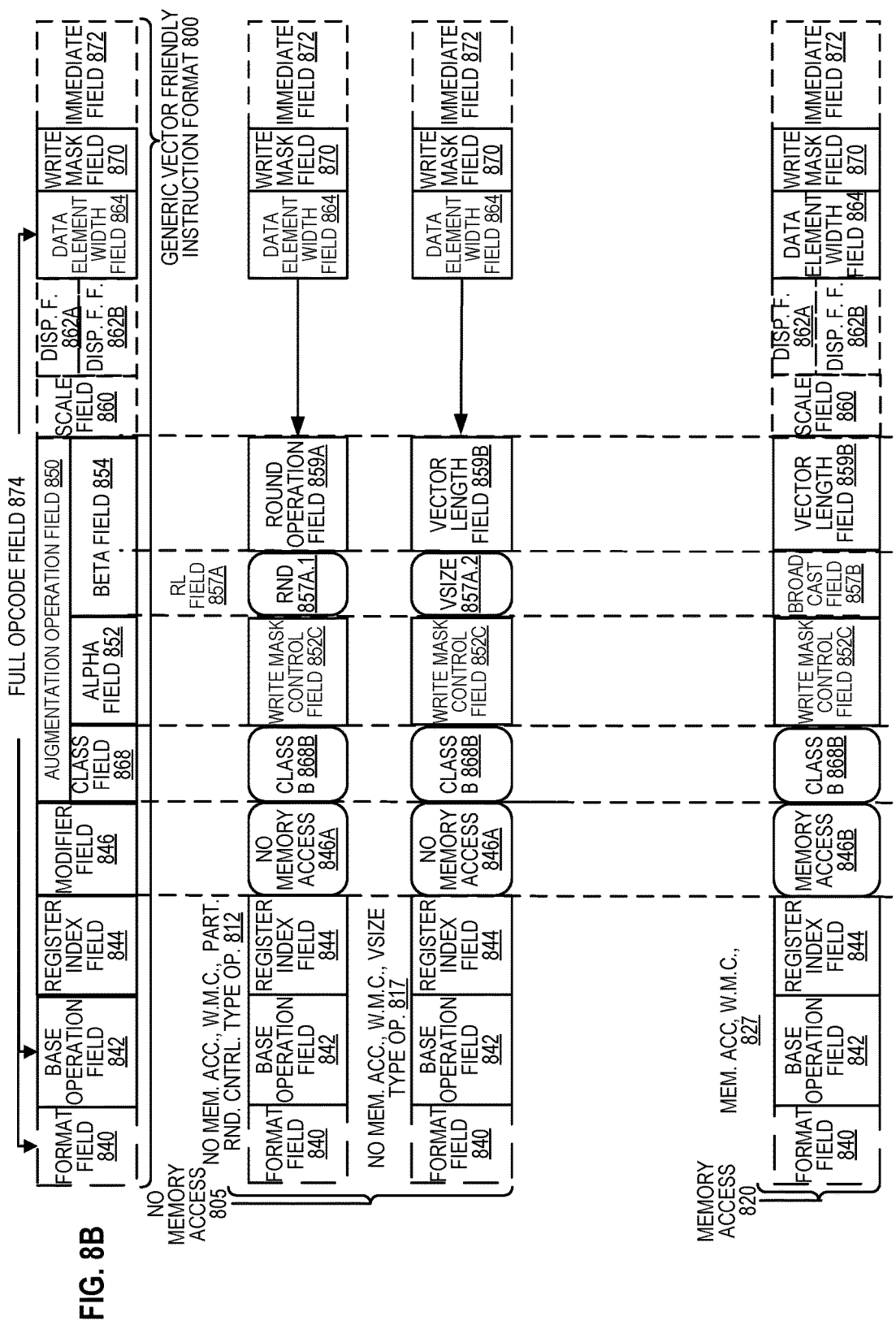

FIGS. 8A-8B are block diagrams illustrating a generic vector friendly instruction format and instruction templates thereof according to embodiments of the invention. FIG. 8A is a block diagram illustrating a generic vector friendly instruction format and class A instruction templates thereof according to embodiments of the invention; while FIG. 8B is a block diagram illustrating the generic vector friendly instruction format and class B instruction templates thereof according to embodiments of the invention. Specifically, a generic vector friendly instruction format 800 for which are defined class A and class B instruction templates, both of which include no memory access 805 instruction templates and memory access 820 instruction templates. The term generic in the context of the vector friendly instruction format refers to the instruction format not being tied to any specific instruction set.

While embodiments of the invention will be described in which the vector friendly instruction format supports the following: a 64 byte vector operand length (or size) with 32 bit (4 byte) or 64 bit (8 byte) data element widths (or sizes) (and thus, a 64 byte vector consists of either 16 doubleword-size elements or alternatively, 8 quadword-size elements); a 64 byte vector operand length (or size) with 16 bit (2 byte) or 8 bit (1 byte) data element widths (or sizes); a 32 byte vector operand length (or size) with 32 bit (4 byte), 64 bit (8 byte), 16 bit (2 byte), or 8 bit (1 byte) data element widths (or sizes); and a 16 byte vector operand length (or size) with 32 bit (4 byte), 64 bit (8 byte), 16 bit (2 byte), or 8 bit (1 byte) data element widths (or sizes); alternative embodiments may support more, less and/or different vector operand sizes (e.g., 256 byte vector operands) with more, less, or different data element widths (e.g., 128 bit (16 byte) data element widths).

The class A instruction templates in FIG. 8A include: 1) within the no memory access 805 instruction templates there is shown a no memory access, full round control type operation 810 instruction template and a no memory access, data transform type operation 815 instruction template; and 2) within the memory access 820 instruction templates there is shown a memory access, temporal 825 instruction template and a memory access, non-temporal 830 instruction template. The class B instruction templates in FIG. 8B include: 1) within the no memory access 805 instruction templates there is shown a no memory access, write mask control, partial round control type operation 812 instruction template and a no memory access, write mask control, vsize type operation 817 instruction template; and 2) within the memory access 820 instruction templates there is shown a memory access, write mask control 827 instruction template.

The generic vector friendly instruction format 800 includes the following fields listed below in the order illustrated in FIGS. 8A-8B.

Format field 840—a specific value (an instruction format identifier value) in this field uniquely identifies the vector friendly instruction format, and thus occurrences of instructions in the vector friendly instruction format in instruction streams. As such, this field is optional in the sense that it is not needed for an instruction set that has only the generic vector friendly instruction format.

Base operation field 842—its content distinguishes different base operations.

Register index field 844—its content, directly or through address generation, specifies the locations of the source and destination operands, be they in registers or in memory. These include a sufficient number of bits to select N registers from a P×Q (e.g. 32×512, 16×128, 32×1024, 64×1024) register file. While in one embodiment N may be up to three sources and one destination register, alternative embodiments may support more or less sources and destination registers (e.g., may support up to two sources where one of these sources also acts as the destination, may support up to three sources where one of these sources also acts as the destination, may support up to two sources and one destination).

Modifier field 846—its content distinguishes occurrences of instructions in the generic vector instruction format that specify memory access from those that do not; that is, between no memory access 805 instruction templates and memory access 820 instruction templates. Memory access operations read and/or write to the memory hierarchy (in some cases specifying the source and/or destination addresses using values in registers), while non-memory access operations do not (e.g., the source and destinations are registers). While in one embodiment this field also selects between three different ways to perform memory address calculations, alternative embodiments may support more, less, or different ways to perform memory address calculations.

Augmentation operation field 850—its content distinguishes which one of a variety of different operations to be performed in addition to the base operation. This field is context specific. In one embodiment of the invention, this field is divided into a class field 868, an alpha field 852, and a beta field 854. The augmentation operation field 850 allows common groups of operations to be performed in a single instruction rather than 2, 3, or 4 instructions.

Scale field 860—its content allows for the scaling of the index field's content for memory address generation (e.g., for address generation that uses $2^{scale}*\text{index}+\text{base}$).

Displacement Field 862A—its content is used as part of memory address generation (e.g., for address generation that uses $2^{scale}*\text{index}+\text{base}+\text{displacement}$).

Displacement Factor Field 862B (note that the juxtaposition of displacement field 862A directly over displacement factor field 862B indicates one or the other is used)—its content is used as part of address generation; it specifies a displacement factor that is to be scaled by the size of a memory access (N)—where N is the number of bytes in the memory access (e.g., for address generation that uses $2^{scale}*\text{index}+\text{base}+\text{scaled displacement}$). Redundant low-order bits are ignored and hence, the displacement factor field's content is multiplied by the memory operands total size (N) in order to generate the final displacement to be used in calculating an effective address. The value of N is determined by the processor hardware at runtime based on the full opcode field 874 (described later herein) and the data manipulation field 854C. The displacement field 862A and the displacement factor field 862B are optional in the sense that they are not used for the no memory access 805 instruction templates and/or different embodiments may implement only one or none of the two.

Data element width field 864—its content distinguishes which one of a number of data element widths is to be used (in some embodiments for all instructions; in other embodiments for only some of the instructions). This field is optional in the sense that it is not needed if only one data element width is supported and/or data element widths are supported using some aspect of the opcodes.

Write mask field 870—its content controls, on a per data element position basis, whether that data element position in the destination vector operand reflects the result of the base operation and augmentation operation. Class A instruction templates support merging-writemasking, while class B instruction templates support both merging- and zeroing-writemasking. When merging, vector masks allow any set of elements in the destination to be protected from updates during the execution of any operation (specified by the base operation and the augmentation operation); in other one embodiment, preserving the old value of each element of the destination where the corresponding mask bit has a 0. In contrast, when zeroing vector masks allow any set of elements in the destination to be zeroed during the execution of any operation (specified by the base operation and the augmentation operation); in one embodiment, an element of the destination is set to 0 when the corresponding mask bit has a 0 value. A subset of this functionality is the ability to control the vector length of the operation being performed (that is, the span of elements being modified, from the first to the last one); however, it is not necessary that the elements that are modified be consecutive. Thus, the write mask field 870 allows for partial vector operations, including loads, stores, arithmetic, logical, etc. While embodiments of the invention are described in which the write mask field's 870 content selects one of a number of write mask registers that contains the write mask to be used (and thus the write mask field's 870 content indirectly identifies that masking to be performed), alternative embodiments instead or additional allow the mask write field's 870 content to directly specify the masking to be performed.

Immediate field 872—its content allows for the specification of an immediate. This field is optional in the sense that is it not present in an implementation of the generic vector friendly format that does not support immediate and it is not present in instructions that do not use an immediate.

Class field 868—its content distinguishes between different classes of instructions. With reference to FIGS. 8A-B, the contents of this field select between class A and class B instructions. In FIGS. 8A-B, rounded corner squares are used to indicate a specific value is present in a field (e.g., class A 868A and class B 868B for the class field 868 respectively in FIGS. 8A-B).

Instruction Templates of Class A

In the case of the non-memory access 805 instruction templates of class A, the alpha field 852 is interpreted as an RS field 852A, whose content distinguishes which one of the different augmentation operation types are to be performed (e.g., round 852A.1 and data transform 852A.2 are respectively specified for the no memory access, round type operation 810 and the no memory access, data transform type operation 815 instruction templates), while the beta field 854 distinguishes which of the operations of the specified type is to be performed. In the no memory access 805 instruction templates, the scale field 860, the displacement field 862A, and the displacement scale filed 862B are not present.

No-Memory Access Instruction Templates—Full Round Control Type Operation

In the no memory access full round control type operation 810 instruction template, the beta field 854 is interpreted as a round control field 854A, whose content(s) provide static rounding. While in the described embodiments of the invention the round control field 854A includes a suppress all floating point exceptions (SAE) field 856 and a round operation control field 858, alternative embodiments may support may encode both these concepts into the same field or only have one or the other of these concepts/fields (e.g., may have only the round operation control field 858).

SAE field 856—its content distinguishes whether or not to disable the exception event reporting; when the SAE field's 856 content indicates suppression is enabled, a given instruction does not report any kind of floating-point exception flag and does not raise any floating point exception handler.

Round operation control field 858—its content distinguishes which one of a group of rounding operations to perform (e.g., Round-up, Round-down, Round-towards-zero and Round-to-nearest). Thus, the round operation control field 858 allows for the changing of the rounding mode on a per instruction basis. In one embodiment of the invention where a processor includes a control register for specifying rounding modes, the round operation control field's 850 content overrides that register value.

No Memory Access Instruction Templates—Data Transform Type Operation

In the no memory access data transform type operation 815 instruction template, the beta field 854 is interpreted as a data transform field 854B, whose content distinguishes which one of a number of data transforms is to be performed (e.g., no data transform, swizzle, broadcast).

In the case of a memory access 820 instruction template of class A, the alpha field 852 is interpreted as an eviction hint field 852B, whose content distinguishes which one of the eviction hints is to be used (in FIG. 8A, temporal 852B.1 and non-temporal 852B.2 are respectively specified for the memory access, temporal 825 instruction template and the memory access, non-temporal 830 instruction template), while the beta field 854 is interpreted as a data manipulation field 854C, whose content distinguishes which one of a number of data manipulation operations (also known as primitives) is to be performed (e.g., no manipulation; broadcast; up conversion of a source; and down conversion of a destination). The memory access 820 instruction templates include the scale field 860, and optionally the displacement field 862A or the displacement scale field 862B.

Vector memory instructions perform vector loads from and vector stores to memory, with conversion support. As with regular vector instructions, vector memory instructions transfer data from/to memory in a data element-wise fashion, with the elements that are actually transferred is dictated by the contents of the vector mask that is selected as the write mask.

Memory Access Instruction Templates—Temporal

Temporal data is data likely to be reused soon enough to benefit from caching. This is, however, a hint, and different processors may implement it in different ways, including ignoring the hint entirely.

Memory Access Instruction Templates—Non-Temporal

Non-temporal data is data unlikely to be reused soon enough to benefit from caching in the 1st-level cache and should be given priority for eviction. This is, however, a hint, and different processors may implement it in different ways, including ignoring the hint entirely.

Instruction Templates of Class B

In the case of the instruction templates of class B, the alpha field 852 is interpreted as a write mask control (Z) field 852C, whose content distinguishes whether the write masking controlled by the write mask field 870 should be a merging or a zeroing.

In the case of the non-memory access 805 instruction templates of class B, part of the beta field 854 is interpreted as an RL field 857A, whose content distinguishes which one of the different augmentation operation types are to be performed (e.g., round 857A.1 and vector length (VSIZE) 857A.2 are respectively specified for the no memory access, write mask control, partial round control type operation 812 instruction template and the no memory access, write mask control, VSIZE type operation 817 instruction template), while the rest of the beta field 854 distinguishes which of the operations of the specified type is to be performed. In the no memory access 805 instruction templates, the scale field 860, the displacement field 862A, and the displacement scale filed 862B are not present.

In the no memory access, write mask control, partial round control type operation 810 instruction template, the rest of the beta field 854 is interpreted as a round operation field 859A and exception event reporting is disabled (a given instruction does not report any kind of floating-point exception flag and does not raise any floating point exception handler).

Round operation control field 859A—just as round operation control field 858, its content distinguishes which one of a group of rounding operations to perform (e.g., Round-up, Round-down, Round-towards-zero and Round-to-nearest). Thus, the round operation control field 859A allows for the changing of the rounding mode on a per instruction basis. In one embodiment of the invention where a processor includes a control register for specifying rounding modes, the round operation control field's 850 content overrides that register value.

In the no memory access, write mask control, VSIZE type operation 817 instruction template, the rest of the beta field 854 is interpreted as a vector length field 859B, whose content distinguishes which one of a number of data vector lengths is to be performed on (e.g., 128, 256, or 512 byte).

In the case of a memory access 820 instruction template of class B, part of the beta field 854 is interpreted as a broadcast field 857B, whose content distinguishes whether or not the broadcast type data manipulation operation is to be performed, while the rest of the beta field 854 is interpreted the vector length field 859B. The memory access 820 instruction templates include the scale field 860, and optionally the displacement field 862A or the displacement scale field 862B.

With regard to the generic vector friendly instruction format 800, a full opcode field 874 is shown including the format field 840, the base operation field 842, and the data element width field 864. While one embodiment is shown where the full opcode field 874 includes all of these fields, the full opcode field 874 includes less than all of these fields in embodiments that do not support all of them. The full opcode field 874 provides the operation code (opcode).

The augmentation operation field 850, the data element width field 864, and the write mask field 870 allow these features to be specified on a per instruction basis in the generic vector friendly instruction format.

The combination of write mask field and data element width field create typed instructions in that they allow the mask to be applied based on different data element widths.

The various instruction templates found within class A and class B are beneficial in different situations. In some embodiments of the invention, different processors or different cores within a processor may support only class A, only class B, or both classes. For instance, a high performance general purpose out-of-order core intended for general-purpose computing may support only class B, a core intended primarily for graphics and/or scientific (throughput) computing may support only class A, and a core intended for both may support both (of course, a core that has some mix of templates and instructions from both classes but not all templates and instructions from both classes is within the purview of the invention). Also, a single processor may include multiple cores, all of which support the same class or in which different cores support different class. For instance, in a processor with separate graphics and general purpose cores, one of the graphics cores intended primarily for graphics and/or scientific computing may support only class A, while one or more of the general purpose cores may be high performance general purpose cores with out of order execution and register renaming intended for general-purpose computing that support only class B. Another processor that does not have a separate graphics core, may include one more general purpose in-order or out-of-order cores that support both class A and class B. Of course, features from one class may also be implement in the other class in different embodiments of the invention. Programs written in a high level language would be put (e.g., just in time compiled or statically compiled) into an variety of different executable forms, including: 1) a form having only instructions of the class(es) supported by the target processor for execution; or 2) a form having alternative routines written using different combinations of the instructions of all classes and having control flow code that selects the routines to execute based on the instructions supported by the processor which is currently executing the code.

Exemplary Specific Vector Friendly Instruction Format

FIG. 9 is a block diagram illustrating an exemplary specific vector friendly instruction format according to embodiments of the invention. FIG. 9 shows a specific vector friendly instruction format 900 that is specific in the sense that it specifies the location, size, interpretation, and order of the fields, as well as values for some of those fields. The specific vector friendly instruction format 900 may be used to extend the x86 instruction set, and thus some of the fields are similar or the same as those used in the existing x86 instruction set and extension thereof (e.g., AVX). This format remains consistent with the prefix encoding field, real opcode byte field, MOD R/M field, SIB field, displacement field, and immediate fields of the existing x86 instruction set with extensions. The fields from FIG. 8 into which the fields from FIG. 9 map are illustrated.

It should be understood that, although embodiments of the invention are described with reference to the specific vector friendly instruction format 900 in the context of the generic vector friendly instruction format 800 for illustrative purposes, the invention is not limited to the specific vector friendly instruction format 900 except where claimed. For example, the generic vector friendly instruction format 800 contemplates a variety of possible sizes for the various fields, while the specific vector friendly instruction format 900 is shown as having fields of specific sizes. By way of specific example, while the data element width field 864 is illustrated as a one bit field in the specific vector friendly instruction format 900, the invention is not so limited (that is, the generic vector friendly instruction format 800 contemplates other sizes of the data element width field 864).

The generic vector friendly instruction format 800 includes the following fields listed below in the order illustrated in FIG. 9A.

EVEX Prefix (Bytes 0-3) 902—is encoded in a four-byte form.

Format Field 840 (EVEX Byte 0, bits [7:0])—the first byte (EVEX Byte 0) is the format field 840 and it contains 0x62 (the unique value used for distinguishing the vector friendly instruction format in one embodiment of the invention).

The second-fourth bytes (EVEX Bytes 1-3) include a number of bit fields providing specific capability.

REX field 905 (EVEX Byte 1, bits [7-5])—consists of a EVEX.R bit field (EVEX Byte 1, bit [7]-R), EVEX.X bit field (EVEX byte 1, bit [6]-X), and 857BEX byte 1, bit[5]-B). The EVEX.R, EVEX.X, and EVEX.B bit fields provide the same functionality as the corresponding VEX bit fields, and are encoded using 1s complement form, i.e. ZMM0 is encoded as 1111B, ZMM15 is encoded as 0000B. Other fields of the instructions encode the lower three bits of the register indexes as is known in the art (rrr, xxx, and bbb), so that Rrrr, Xxxx, and Bbbb may be formed by adding EVEX.R, EVEX.X, and EVEX.B.

REX' field 810—this is the first part of the REX' field 810 and is the EVEX.R' bit field (EVEX Byte 1, bit [4]-R') that is used to encode either the upper 16 or lower 16 of the extended 32 register set. In one embodiment of the invention, this bit, along with others as indicated below, is stored in bit inverted format to distinguish (in the well-known x86 32-bit mode) from the BOUND instruction, whose real opcode byte is 62, but does not accept in the MOD R/M field (described below) the value of 11 in the MOD field; alternative embodiments of the invention do not store this and the other indicated bits below in the inverted format. A value of 1 is used to encode the lower 16 registers. In other words, R'Rrrr is formed by combining EVEX.R', EVEX.R, and the other RRR from other fields.

Opcode map field 915 (EVEX byte 1, bits [3:0]-mmmm)—its content encodes an implied leading opcode byte (0F, 0F 38, or 0F 3).

Data element width field 864 (EVEX byte 2, bit [7]-W)—is represented by the notation EVEX.W. EVEX.W is used to define the granularity (size) of the datatype (either 32-bit data elements or 64-bit data elements).

EVEX.vvvv 920 (EVEX Byte 2, bits [6:3]-vvvv)—the role of EVEX.vvvv may include the following: 1) EVEX.vvvv encodes the first source register operand, specified in inverted (1s complement) form and is valid for instructions with 2 or more source operands; 2) EVEX.vvvv encodes the destination register operand, specified in 1s complement form for certain vector shifts; or 3) EVEX.vvvv does not encode any operand, the field is reserved and should contain 1111b. Thus, EVEX.vvvv field 920 encodes the 4 low-order bits of the first source register specifier stored in inverted (1s complement) form. Depending on the instruction, an extra different EVEX bit field is used to extend the specifier size to 32 registers.

EVEX.U 868 Class field (EVEX byte 2, bit [2]-U)—If EVEX.U=0, it indicates class A or EVEX.U0; if EVEX.U=1, it indicates class B or EVEX.U1.

Prefix encoding field 925 (EVEX byte 2, bits [1:0]-pp)—provides additional bits for the base operation field. In addition to providing support for the legacy SSE instructions in the EVEX prefix format, this also has the benefit of compacting the SIMD prefix (rather than requiring a byte to express the SIMD prefix, the EVEX prefix requires only 2 bits). In one embodiment, to support legacy SSE instructions that use a SIMD prefix (66H, F2H, F3H) in both the legacy format and in the EVEX prefix format, these legacy SIMD prefixes are encoded into the SIMD prefix encoding field; and at runtime are expanded into the legacy SIMD prefix prior to being provided to the decoder's PLA (so the PLA can execute both the legacy and EVEX format of these legacy instructions without modification). Although newer instructions could use the EVEX prefix encoding field's content directly as an opcode extension, certain embodiments expand in a similar fashion for consistency but allow for different meanings to be specified by these legacy SIMD prefixes. An alternative embodiment may redesign the PLA to support the 2 bit SIMD prefix encodings, and thus not require the expansion.

Alpha field 852 (EVEX byte 3, bit [7]-EH; also known as EVEX.EH, EVEX.rs, EVEX.RL, EVEX.write mask control, and EVEX.N; also illustrated with α)—as previously described, this field is context specific.

Beta field 854 (EVEX byte 3, bits [6:4]-SSS, also known as EVEX.$s_{2-0}$, EVEX.$r_{2-0}$, EVEX.rr1, EVEX.LL0, EVEX.LLB; also illustrated with βββ)—as previously described, this field is context specific.

REX' field 810—this is the remainder of the REX' field and is the EVEX.V' bit field (EVEX Byte 3, bit [3]-V') that may be used to encode either the upper 16 or lower 16 of the extended 32 register set. This bit is stored in bit inverted format. A value of 1 is used to encode the lower 16 registers. In other words, V'VVVV is formed by combining EVEX.V', EVEX.vvvv.

Write mask field 870 (EVEX byte 3, bits [2:0]-kkk)—its content specifies the index of a register in the write mask registers as previously described. In one embodiment of the invention, the specific value EVEX.kkk=000 has a special behavior implying no write mask is used for the particular instruction (this may be implemented in a variety of ways including the use of a write mask hardwired to all ones or hardware that bypasses the masking hardware).

Real Opcode Field 930 (Byte 4) is also known as the opcode byte. Part of the opcode is specified in this field.

MOD R/M Field 940 (Byte 5) includes MOD field 942, Reg field 944, and R/M field 946. As previously described, the MOD field's 942 content distinguishes between memory access and non-memory access operations. The role of Reg field 944 can be summarized to two situations: encoding either the destination register operand or a source register operand, or be treated as an opcode extension and not used to encode any instruction operand. The role of R/M field 946 may include the following: encoding the instruction operand that references a memory address, or encoding either the destination register operand or a source register operand.

Scale, Index, Base (SIB) Byte (Byte 6)—As previously described, the scale field's 850 content is used for memory address generation. SIB.xxx 954 and SIB.bbb 956—the contents of these fields have been previously referred to with regard to the register indexes Xxxx and Bbbb.

Displacement field 862A (Bytes 7-10)—when MOD field 942 contains 10, bytes 7-10 are the displacement field 862A, and it works the same as the legacy 32-bit displacement (disp32) and works at byte granularity.

Displacement factor field 862B (Byte 7)—when MOD field 942 contains 01, byte 7 is the displacement factor field 862B. The location of this field is that same as that of the legacy x86 instruction set 8-bit displacement (disp8), which works at byte granularity. Since disp8 is sign extended, it can only address between −128 and 127 bytes offsets; in terms of 64 byte cache lines, disp8 uses 8 bits that can be set to only four really useful values −128, −64, 0, and 64; since a greater range is often needed, disp32 is used; however, disp32 requires 4 bytes. In contrast to disp8 and disp32, the displacement factor field 862B is a reinterpretation of disp8; when using displacement factor field 862B, the actual displacement is determined by the content of the displacement factor field multiplied by the size of the memory operand access (N). This type of displacement is referred to as disp8*N. This reduces the average instruction length (a single byte of used for the displacement but with a much greater range). Such compressed displacement is based on the assumption that the effective displacement is multiple of the granularity of the memory access, and hence, the redundant low-order bits of the address offset do not need to be encoded. In other words, the displacement factor field 862B substitutes the legacy x86 instruction set 8-bit displacement. Thus, the displacement factor field 862B is encoded the same way as an x86 instruction set 8-bit displacement (so no changes in the ModRM/SIB encoding rules) with the only exception that disp8 is overloaded to disp8*N. In other words, there are no changes in the encoding rules or encoding lengths but only in the interpretation of the displacement value by hardware (which needs to scale the displacement by the size of the memory operand to obtain a byte-wise address offset).

Immediate field 872 operates as previously described.

Full Opcode Field

FIG. 9B is a block diagram illustrating the fields of the specific vector friendly instruction format 900 that make up the full opcode field 874 according to one embodiment of the invention. Specifically, the full opcode field 874 includes the format field 840, the base operation field 842, and the data element width (W) field 864. The base operation field 842 includes the prefix encoding field 925, the opcode map field 915, and the real opcode field 930.

Register Index Field

FIG. 9C is a block diagram illustrating the fields of the specific vector friendly instruction format 900 that make up the register index field 844 according to one embodiment of the invention. Specifically, the register index field 844 includes the REX field 905, the REX' field 910, the MODR/M.reg field 944, the MODR/M.r/m field 946, the VVVV field 920, xxx field 954, and the bbb field 956.

Augmentation Operation Field

Figure 9D:
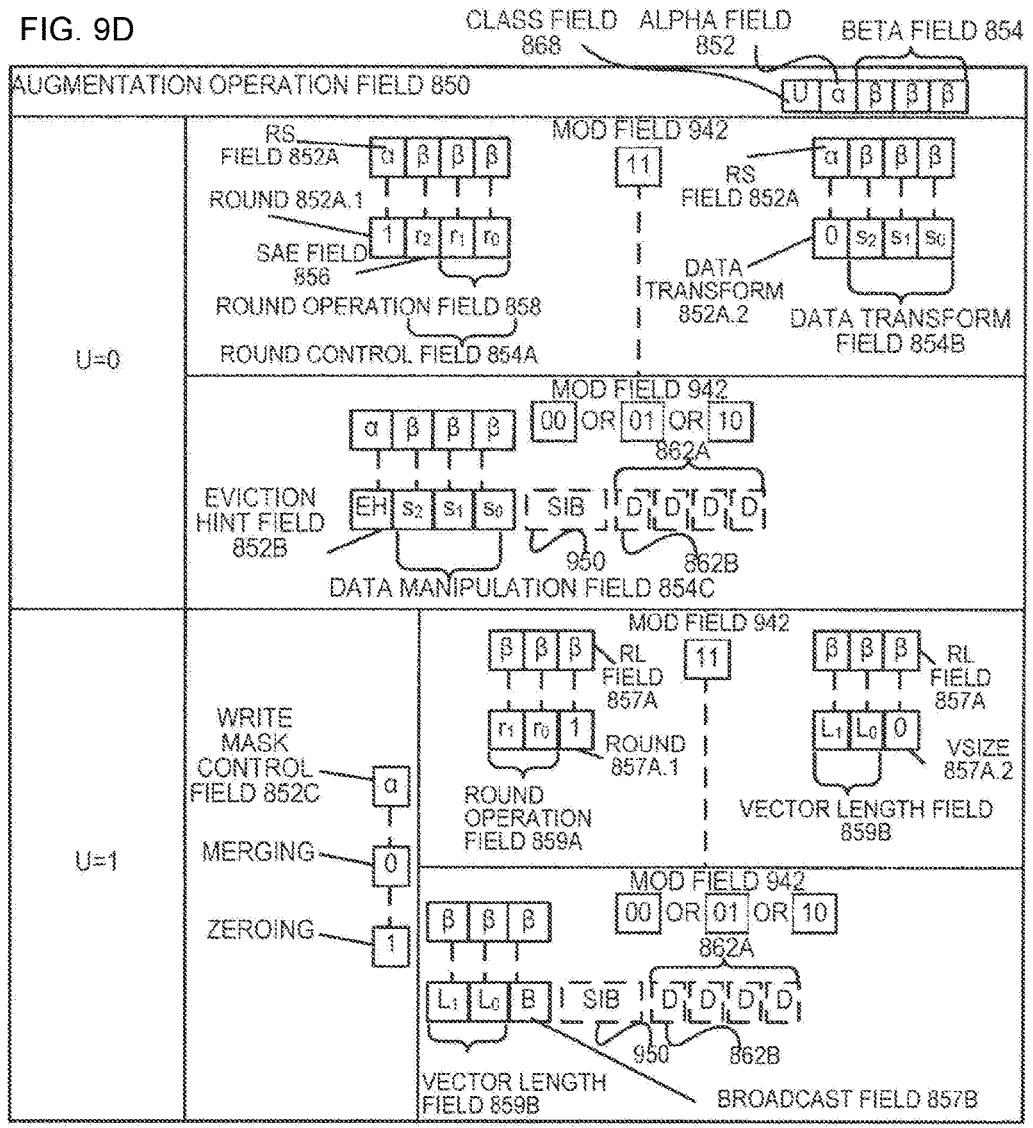

FIG. 9D is a block diagram illustrating the fields of the specific vector friendly instruction format 900 that make up the augmentation operation field 850 according to one embodiment of the invention. When the class (U) field 868 contains 0, it signifies EVEX.U0 (class A 868A); when it contains 1, it signifies EVEX.U1 (class B 868B). When U=0 and the MOD field 942 contains 11 (signifying a no memory access operation), the alpha field 852 (EVEX byte 3, bit [7]-EH) is interpreted as the rs field 852A. When the rs field 852A contains a 1 (round 852A.1), the beta field 854 (EVEX byte 3, bits [6:4]-SSS) is interpreted as the round control field 854A. The round control field 854A includes a one bit SAE field 856 and a two bit round operation field 858. When the rs field 852A contains a 0 (data transform 852A.2), the beta field 854 (EVEX byte 3, bits [6:4]-SSS) is interpreted as a three bit data transform field 854B. When U=0 and the MOD field 942 contains 00, 01, or 10 (signifying a memory access operation), the alpha field 852 (EVEX byte 3, bit [7]-EH) is interpreted as the eviction hint (EH) field 852B and the beta field 854 (EVEX byte 3, bits [6:4]-SSS) is interpreted as a three bit data manipulation field 854C.

When U=1, the alpha field 852 (EVEX byte 3, bit [7]-EH) is interpreted as the write mask control (Z) field 852C. When U=1 and the MOD field 942 contains 11 (signifying a no memory access operation), part of the beta field 854 (EVEX byte 3, bit [4]-$S_0$) is interpreted as the RL field 857A; when it contains a 1 (round 857A.1) the rest of the beta field 854 (EVEX byte 3, bit [6-5]-$S_{2-1}$) is interpreted as the round operation field 859A, while when the RL field 857A contains a 0 (VSIZE 857.A2) the rest of the beta field 854 (EVEX byte 3, bit [6-5]-$S_{2-1}$) is interpreted as the vector length field 859B (EVEX byte 3, bit [6-5]-$L_{1-0}$). When U=1 and the MOD field 942 contains 00, 01, or 10 (signifying a memory access operation), the beta field 854 (EVEX byte 3, bits [6:4]-SSS) is interpreted as the vector length field 859B (EVEX byte 3, bit [6-5]-$L_{1-0}$) and the broadcast field 857B (EVEX byte 3, bit [4]-B).

Exemplary Register Architecture

FIG. 10 is a block diagram of a register architecture 1000 according to one embodiment of the invention. In the embodiment illustrated, there are 32 vector registers 1010 that are 512 bits wide; these registers are referenced as zmm0 through zmm31. The lower order 256 bits of the lower 16 zmm registers are overlaid on registers ymm0-16. The lower order 128 bits of the lower 16 zmm registers (the lower order 128 bits of the ymm registers) are overlaid on registers xmm0-15. The specific vector friendly instruction format 900 operates on these overlaid register file as illustrated in the below tables.

| Adjustable Vector Length | Class | Operations | Registers |
|---|---|---|---|
| Instruction Templates that do not include the vector length field 859B | A (FIG. 8A; U = 0) | 810, 815, 825, 830 | zmm registers (the vector length is 64 byte) |
| | B (FIG. 8B; U = 1) | 812 | zmm registers (the vector length is 64 byte) |
| Instruction Templates that do include the vector length field 859B | B (FIG. 8B; U = 1) | 817, 827 | zmm, ymm, or xmm registers (the vector length is 64 byte, 32 byte, or 16 byte) depending on the vector length field 859B |

In other words, the vector length field 859B selects between a maximum length and one or more other shorter lengths, where each such shorter length is half the length of the preceding length; and instructions templates without the vector length field 859B operate on the maximum vector length. Further, in one embodiment, the class B instruction templates of the specific vector friendly instruction format 900 operate on packed or scalar single/double-precision floating point data and packed or scalar integer data. Scalar operations are operations performed on the lowest order data element position in an zmm/ymm/xmm register; the higher order data element positions are either left the same as they were prior to the instruction or zeroed depending on the embodiment.

Write mask registers 1015—in the embodiment illustrated, there are 8 write mask registers (k0 through k7), each 64 bits in size. In an alternate embodiment, the write mask registers 1015 are 16 bits in size. As previously described, in one embodiment of the invention, the vector mask register k0 cannot be used as a write mask; when the encoding that would normally indicate k0 is used for a write mask, it selects a hardwired write mask of 0xFFFF, effectively disabling write masking for that instruction.

General-purpose registers 1025—in the embodiment illustrated, there are sixteen 64-bit general-purpose registers that are used along with the existing x86 addressing modes to address memory operands. These registers are referenced by the names RAX, RBX, RCX, RDX, RBP, RSI, RDI, RSP, and R8 through R15.

Scalar floating point stack register file (x87 stack) 1045, on which is aliased the MMX packed integer flat register file 1050—in the embodiment illustrated, the x87 stack is an eight-element stack used to perform scalar floating-point operations on 32/64/80-bit floating point data using the x87 instruction set extension; while the MMX registers are used to perform operations on 64-bit packed integer data, as well as to hold operands for some operations performed between the MMX and XMM registers.

Alternative embodiments of the invention may use wider or narrower registers. Additionally, alternative embodiments of the invention may use more, less, or different register files and registers.

Exemplary Core Architectures, Processors, and Computer Architectures

Processor cores may be implemented in different ways, for different purposes, and in different processors. For instance, implementations of such cores may include: 1) a general purpose in-order core intended for general-purpose computing; 2) a high performance general purpose out-of-order core intended for general-purpose computing; 3) a special purpose core intended primarily for graphics and/or scientific (throughput) computing. Implementations of different processors may include: 1) a CPU including one or more general purpose in-order cores intended for general-purpose computing and/or one or more general purpose out-of-order cores intended for general-purpose computing; and 2) a coprocessor including one or more special purpose cores intended primarily for graphics and/or scientific (throughput). Such different processors lead to different computer system architectures, which may include: 1) the coprocessor on a separate chip from the CPU; 2) the coprocessor on a separate die in the same package as a CPU; 3) the coprocessor on the same die as a CPU (in which case, such a coprocessor is sometimes referred to as special purpose logic, such as integrated graphics and/or scientific (throughput) logic, or as special purpose cores); and 4) a system on a chip that may include on the same die the described CPU (sometimes referred to as the application core(s) or application processor(s)), the above described coprocessor, and additional functionality. Exemplary core architectures are described next, followed by descriptions of exemplary processors and computer architectures.

Exemplary Core Architectures

In-Order and Out-of-Order Core Block Diagram

FIG. 11A is a block diagram illustrating both an exemplary in-order pipeline and an exemplary register renaming, out-of-order issue/execution pipeline according to embodiments of the invention. FIG. 11B is a block diagram illustrating both an exemplary embodiment of an in-order architecture core and an exemplary register renaming, out-of-order issue/execution architecture core to be included in a processor according to embodiments of the invention. The solid lined boxes in FIGS. 11A-B illustrate the in-order pipeline and in-order core, while the optional addition of the dashed lined boxes illustrates the register renaming, out-of-order issue/execution pipeline and core. Given that the in-order aspect is a subset of the out-of-order aspect, the out-of-order aspect will be described.

In FIG. 11A, a processor pipeline 1100 includes a fetch stage 1102, a length decode stage 1104, a decode stage 1106, an allocation stage 1108, a renaming stage 1110, a scheduling (also known as a dispatch or issue) stage 1112, a register read/memory read stage 1114, an execute stage 1116, a write back/memory write stage 1118, an exception handling stage 1122, and a commit stage 1124.

FIG. 11B shows processor core 1190 including a front end unit 1130 coupled to an execution engine unit 1150, and both are coupled to a memory unit 1170. The core 1190 may be a reduced instruction set computing (RISC) core, a complex instruction set computing (CISC) core, a very long instruction word (VLIW) core, or a hybrid or alternative core type. As yet another option, the core 1190 may be a special-purpose core, such as, for example, a network or communication core, compression engine, coprocessor core, general purpose computing graphics processing unit (GPGPU) core, graphics core, or the like.

The front end unit 1130 includes a branch prediction unit 1132 coupled to an instruction cache unit 1134, which is coupled to an instruction translation lookaside buffer (TLB) 1136, which is coupled to an instruction fetch unit 1138, which is coupled to a decode unit 1140. The decode unit 1140 (or decoder) may decode instructions, and generate as an output one or more micro-operations, micro-code entry points, microinstructions, other instructions, or other control signals, which are decoded from, or which otherwise reflect, or are derived from, the original instructions. The decode unit 1140 may be implemented using various different mechanisms. Examples of suitable mechanisms include, but are not limited to, look-up tables, hardware implementations, programmable logic arrays (PLAs), microcode read only memories (ROMs), etc. In one embodiment, the core 1190 includes a microcode ROM or other medium that stores microcode for certain macroinstructions (e.g., in decode unit 1140 or otherwise within the front end unit 1130). The decode unit 1140 is coupled to a rename/allocator unit 1152 in the execution engine unit 1150.

The execution engine unit 1150 includes the rename/allocator unit 1152 coupled to a retirement unit 1154 and a set of one or more scheduler unit(s) 1156. The scheduler unit(s) 1156 represents any number of different schedulers, including reservations stations, central instruction window, etc. The scheduler unit(s) 1156 is coupled to the physical register file(s) unit(s) 1158. Each of the physical register file(s) units 1158 represents one or more physical register files, different ones of which store one or more different data types, such as scalar integer, scalar floating point, packed integer, packed floating point, vector integer, vector floating point, status (e.g., an instruction pointer that is the address of the next instruction to be executed), etc. In one embodiment, the physical register file(s) unit 1158 comprises a vector registers unit, a write mask registers unit, and a scalar registers unit. These register units may provide architectural vector registers, vector mask registers, and general purpose registers. The physical register file(s) unit(s) 1158 is overlapped by the retirement unit 1154 to illustrate various ways in which register renaming and out-of-order execution may be implemented (e.g., using a reorder buffer(s) and a retirement register file(s); using a future file(s), a history buffer(s), and a retirement register file(s); using a register maps and a pool of registers; etc.). The retirement unit 1154 and the physical register file(s) unit(s) 1158 are coupled to the execution cluster(s) 1160. The execution cluster(s) 1160 includes a set of one or more execution units 1162 and a set of one or more memory access units 1164. The execution units 1162 may perform various operations (e.g., shifts, addition, subtraction, multiplication) and on various types of data (e.g., scalar floating point, packed integer, packed floating point, vector integer, vector floating point). While some embodiments may include a number of execution units dedicated to specific functions or sets of functions, other embodiments may include only one execution unit or multiple execution units that all perform all functions. The scheduler unit(s) 1156, physical register file(s) unit(s) 1158, and execution cluster(s) 1160 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster—and in the case of a separate memory access pipeline, certain embodiments are implemented in which only the execution cluster of this pipeline has the memory access unit(s) 1164). It should also be understood that where separate pipelines are used, one or more of these pipelines may be out-of-order issue/execution and the rest in-order.

The set of memory access units 1164 is coupled to the memory unit 1170, which includes a data TLB unit 1172 coupled to a data cache unit 1174 coupled to a level 2 (L2) cache unit 1176. In one exemplary embodiment, the memory access units 1164 may include a load unit, a store address unit, and a store data unit, each of which is coupled to the data TLB unit 1172 in the memory unit 1170. The instruction cache unit 1134 is further coupled to a level 2 (L2) cache unit 1176 in the memory unit 1170. The L2 cache unit 1176 is coupled to one or more other levels of cache and eventually to a main memory.

By way of example, the exemplary register renaming, out-of-order issue/execution core architecture may implement the pipeline 1100 as follows: 1) the instruction fetch 1138 performs the fetch and length decoding stages 1102 and 1104; 2) the decode unit 1140 performs the decode stage 1106; 3) the rename/allocator unit 1152 performs the allocation stage 1108 and renaming stage 1110; 4) the scheduler unit(s) 1156 performs the schedule stage 1112; 5) the physical register file(s) unit(s) 1158 and the memory unit 1170 perform the register read/memory read stage 1114; the execution cluster 1160 perform the execute stage 1116; 6) the memory unit 1170 and the physical register file(s) unit(s) 1158 perform the write back/memory write stage 1118; 7) various units may be involved in the exception handling stage 1122; and 8) the retirement unit 1154 and the physical register file(s) unit(s) 1158 perform the commit stage 1124.

The core 1190 may support one or more instructions sets (e.g., the x86 instruction set (with some extensions that have been added with newer versions); the MIPS instruction set of MIPS Technologies of Sunnyvale, Calif.; the ARM instruction set (with optional additional extensions such as NEON) of ARM Holdings of Sunnyvale, Calif.), including the instruction(s) described herein. In one embodiment, the core 1190 includes logic to support a packed data instruction set extension (e.g., AVX1, AVX2, and/or some form of the generic vector friendly instruction format (U=0 and/or U=1) previously described), thereby allowing the operations used by many multimedia applications to be performed using packed data.

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used in an in-order architecture. While the illustrated embodiment of the processor also includes separate instruction and data cache units 1134/1174 and a shared L2 cache unit 1176, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

Specific Exemplary In-Order Core Architecture

Figure 12B:
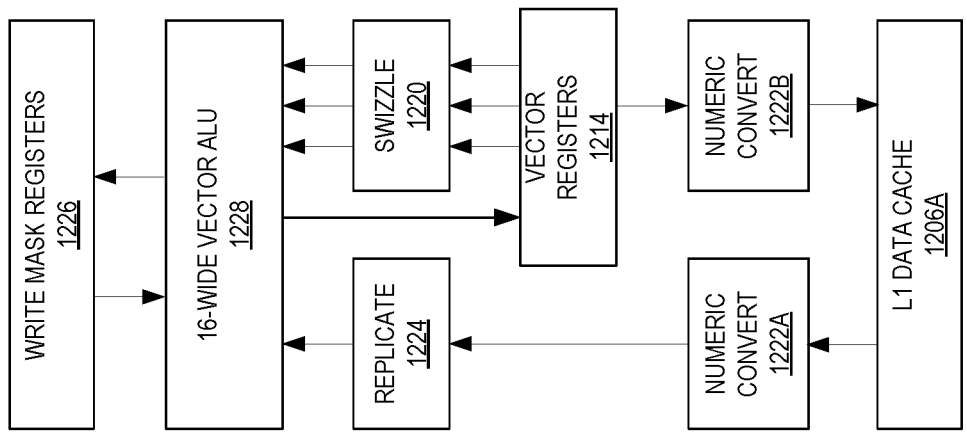
FIGS. 12A-B illustrate a block diagram of a more specific exemplary in-order core architecture, which core would be one of several logic blocks (including other cores of the same type and/or different types) in a chip
Figure 12A:
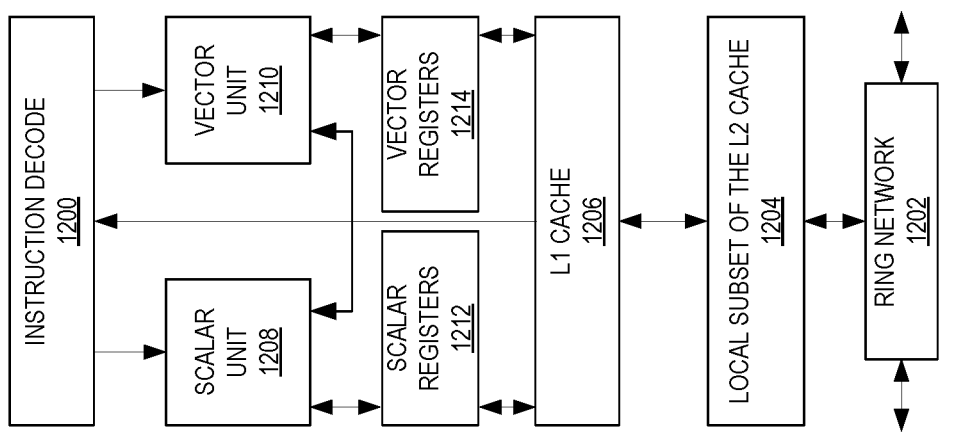

FIGS. 12A-B illustrate a block diagram of a more specific exemplary in-order core architecture, which core would be one of several logic blocks (including other cores of the same type and/or different types) in a chip. The logic blocks communicate through a high-bandwidth interconnect network (e.g., a ring network) with some fixed function logic, memory I/O interfaces, and other necessary I/O logic, depending on the application.

FIG. 12A is a block diagram of a single processor core, along with its connection to the on-die interconnect network 1202 and with its local subset of the Level 2 (L2) cache 1204, according to embodiments of the invention. In one embodiment, an instruction decoder 1200 supports the x86 instruction set with a packed data instruction set extension. An L1 cache 1206 allows low-latency accesses to cache memory into the scalar and vector units. While in one embodiment (to simplify the design), a scalar unit 1208 and a vector unit 1210 use separate register sets (respectively, scalar registers 1212 and vector registers 1214) and data transferred between them is written to memory and then read back in from a level 1 (L1) cache 1206, alternative embodiments of the invention may use a different approach (e.g., use a single register set or include a communication path that allow data to be transferred between the two register files without being written and read back).

The local subset of the L2 cache 1204 is part of a global L2 cache that is divided into separate local subsets, one per processor core. Each processor core has a direct access path to its own local subset of the L2 cache 1204. Data read by a processor core is stored in its L2 cache subset 1204 and can be accessed quickly, in parallel with other processor cores accessing their own local L2 cache subsets. Data written by a processor core is stored in its own L2 cache subset 1204 and is flushed from other subsets, if necessary. The ring network ensures coherency for shared data. The ring network is bi-directional to allow agents such as processor cores, L2 caches and other logic blocks to communicate with each other within the chip. Each ring data-path is 1012-bits wide per direction.

FIG. 12B is an expanded view of part of the processor core in FIG. 12A according to embodiments of the invention. FIG. 12B includes an L1 data cache 1206A part of the L1 cache 1204, as well as more detail regarding the vector unit 1210 and the vector registers 1214. Specifically, the vector unit 1210 is a 16-wide vector processing unit (VPU) (see the 16-wide ALU 1228), which executes one or more of integer, single-precision float, and double-precision float instructions. The VPU supports swizzling the register inputs with swizzle unit 1220, numeric conversion with numeric convert units 1222A-B, and replication with replication unit 1224 on the memory input. Write mask registers 1226 allow predicating resulting vector writes.

Processor with Integrated Memory Controller and Graphics

Figure 13:
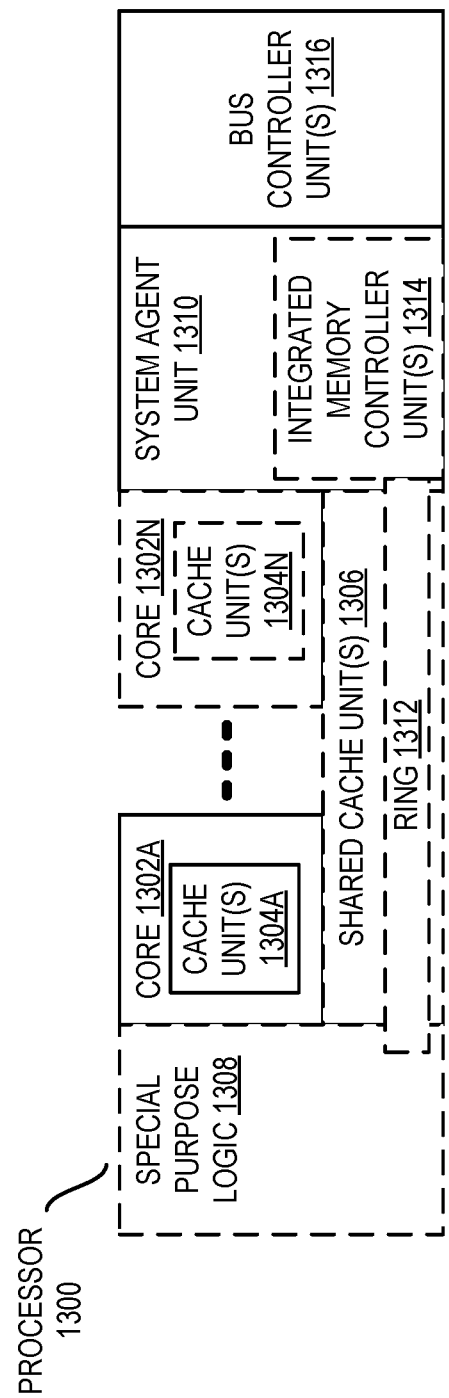
FIG. 13 is a block diagram of a processor that may have more than one core, may have an integrated memory controller, and may have integrated graphics according to embodiments of the invention.

FIG. 13 is a block diagram of a processor 1300 that may have more than one core, may have an integrated memory controller, and may have integrated graphics according to embodiments of the invention. The solid lined boxes in FIG. 13 illustrate a processor 1300 with a single core 1302A, a system agent 1310, a set of one or more bus controller units 1316, while the optional addition of the dashed lined boxes illustrates an alternative processor 1300 with multiple cores 1302A-N, a set of one or more integrated memory controller unit(s) 1314 in the system agent unit 1310, and special purpose logic 1308.

Thus, different implementations of the processor 1300 may include: 1) a CPU with the special purpose logic 1308 being integrated graphics and/or scientific (throughput) logic (which may include one or more cores), and the cores 1302A-N being one or more general purpose cores (e.g., general purpose in-order cores, general purpose out-of-order cores, a combination of the two); 2) a coprocessor with the cores 1302A-N being a large number of special purpose cores intended primarily for graphics and/or scientific (throughput); and 3) a coprocessor with the cores 1302A-N being a large number of general purpose in-order cores. Thus, the processor 1300 may be a general-purpose processor, coprocessor or special-purpose processor, such as, for example, a network or communication processor, compression engine, graphics processor, GPGPU (general purpose graphics processing unit), a high-throughput many integrated core (MIC) coprocessor (including 30 or more cores), embedded processor, or the like. The processor may be implemented on one or more chips. The processor 1300 may be a part of and/or may be implemented on one or more substrates using any of a number of process technologies, such as, for example, BiCMOS, CMOS, or NMOS.

The memory hierarchy includes one or more levels of cache within the cores, a set or one or more shared cache units 1306, and external memory (not shown) coupled to the set of integrated memory controller units 1314. The set of shared cache units 1306 may include one or more mid-level caches, such as level 2 (L2), level 3 (L3), level 4 (L4), or other levels of cache, a last level cache (LLC), and/or combinations thereof. While in one embodiment a ring based interconnect unit 1312 interconnects the integrated graphics logic 1308, the set of shared cache units 1306, and the system agent unit 1310/integrated memory controller unit(s) 1314, alternative embodiments may use any number of well-known techniques for interconnecting such units. In one embodiment, coherency is maintained between one or more cache units 1306 and cores 1302-A-N.

In some embodiments, one or more of the cores 1302A-N are capable of multi-threading. The system agent 1310 includes those components coordinating and operating cores 1302A-N. The system agent unit 1310 may include for example a power control unit (PCU) and a display unit. The PCU may be or include logic and components needed for regulating the power state of the cores 1302A-N and the integrated graphics logic 1308. The display unit is for driving one or more externally connected displays.

The cores 1302A-N may be homogenous or heterogeneous in terms of architecture instruction set; that is, two or more of the cores 1302A-N may be capable of execution the same instruction set, while others may be capable of executing only a subset of that instruction set or a different instruction set.

Exemplary Computer Architectures

FIGS. 14-17 are block diagrams of exemplary computer architectures. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

Figure 14:
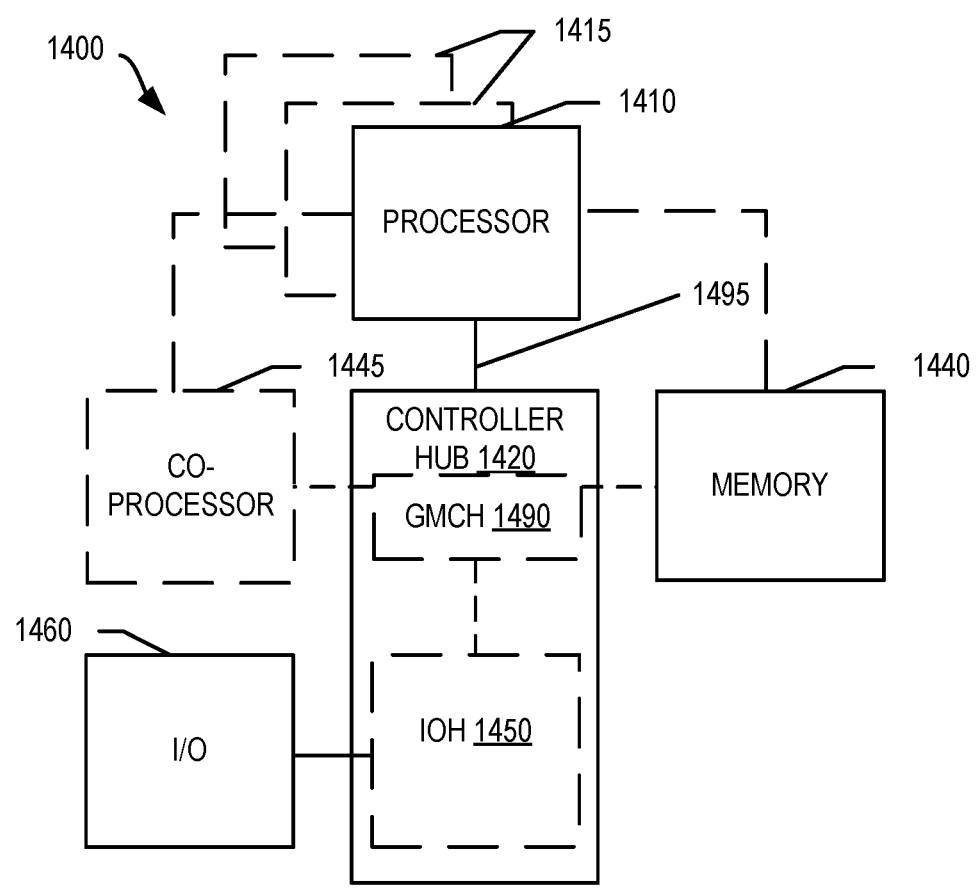
FIG. 14 is a block diagram of a system in accordance with one embodiment of the present invention.

Referring now to FIG. 14, shown is a block diagram of a system 1400 in accordance with one embodiment of the present invention. The system 1400 may include one or more processors 1410, 1415, which are coupled to a controller hub 1420. In one embodiment the controller hub 1420 includes a graphics memory controller hub (GMCH) 1490 and an Input/Output Hub (IOH) 1450 (which may be on separate chips); the GMCH 1490 includes memory and graphics controllers to which are coupled memory 1440 and a coprocessor 1445; the IOH 1450 is couples input/output (I/O) devices 1460 to the GMCH 1490. Alternatively, one or both of the memory and graphics controllers are integrated within the processor (as described herein), the memory 1440 and the coprocessor 1445 are coupled directly to the processor 1410, and the controller hub 1420 in a single chip with the IOH 1450.

The optional nature of additional processors 1415 is denoted in FIG. 14 with broken lines. Each processor 1410, 1415 may include one or more of the processing cores described herein and may be some version of the processor 1300.

The memory 1440 may be, for example, dynamic random access memory (DRAM), phase change memory (PCM), or a combination of the two. For at least one embodiment, the controller hub 1420 communicates with the processor(s) 1410, 1415 via a multi-drop bus, such as a frontside bus (FSB), point-to-point interface such as QuickPath Interconnect (QPI), or similar connection 1495.

In one embodiment, the coprocessor 1445 is a special-purpose processor, such as, for example, a high-throughput MIC processor, a network or communication processor, compression engine, graphics processor, GPGPU, embedded processor, or the like. In one embodiment, controller hub 1420 may include an integrated graphics accelerator.

There can be a variety of differences between the physical resources 1410, 1415 in terms of a spectrum of metrics of merit including architectural, microarchitectural, thermal, power consumption characteristics, and the like.

In one embodiment, the processor 1410 executes instructions that control data processing operations of a general type. Embedded within the instructions may be coprocessor instructions. The processor 1410 recognizes these coprocessor instructions as being of a type that should be executed by the attached coprocessor 1445. Accordingly, the processor 1410 issues these coprocessor instructions (or control signals representing coprocessor instructions) on a coprocessor bus or other interconnect, to coprocessor 1445. Coprocessor(s) 1445 accept and execute the received coprocessor instructions.

Figure 15:
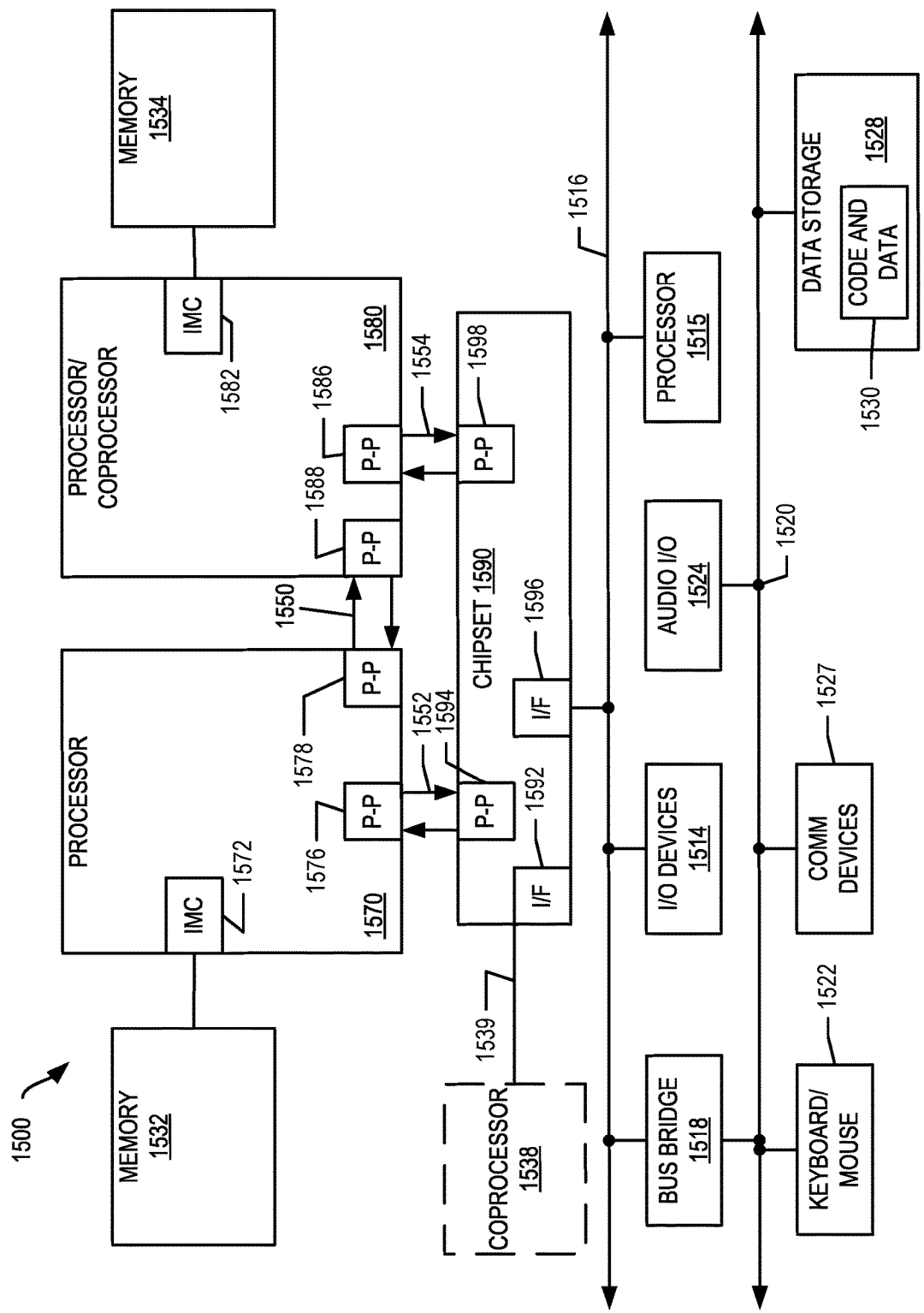
FIG. 15 is a block diagram of a first more specific exemplary system in accordance with an embodiment of the present invention.

Referring now to FIG. 15, shown is a block diagram of a first more specific exemplary system 1500 in accordance with an embodiment of the present invention. As shown in FIG. 15, multiprocessor system 1500 is a point-to-point interconnect system, and includes a first processor 1570 and a second processor 1580 coupled via a point-to-point interconnect 1550. Each of processors 1570 and 1580 may be some version of the processor 1300. In one embodiment of the invention, processors 1570 and 1580 are respectively processors 1410 and 1415, while coprocessor 1538 is coprocessor 1445. In another embodiment, processors 1570 and 1580 are respectively processor 1410 coprocessor 1445.

Processors 1570 and 1580 are shown including integrated memory controller (IMC) units 1572 and 1582, respectively. Processor 1570 also includes as part of its bus controller units point-to-point (P-P) interfaces 1576 and 1578; similarly, second processor 1580 includes P-P interfaces 1586 and 1588. Processors 1570, 1580 may exchange information via a point-to-point (P-P) interface 1550 using P-P interface circuits 1578, 1588. As shown in FIG. 15, IMCs 1572 and 1582 couple the processors to respective memories, namely a memory 1532 and a memory 1534, which may be portions of main memory locally attached to the respective processors.

Processors 1570, 1580 may each exchange information with a chipset 1590 via individual P-P interfaces 1552, 1554 using point to point interface circuits 1576, 1594, 1586, 1598. Chipset 1590 may optionally exchange information with the coprocessor 1538 via a high-performance interface 1539. In one embodiment, the coprocessor 1538 is a special-purpose processor, such as, for example, a high-throughput MIC processor, a network or communication processor, compression engine, graphics processor, GPGPU, embedded processor, or the like.

A shared cache (not shown) may be included in either processor or outside of both processors, yet connected with the processors via P-P interconnect, such that either or both processors' local cache information may be stored in the shared cache if a processor is placed into a low power mode.

Chipset 1590 may be coupled to a first bus 1516 via an interface 1596. In one embodiment, first bus 1516 may be a Peripheral Component Interconnect (PCI) bus, or a bus such as a PCI Express bus or another third generation I/O interconnect bus, although the scope of the present invention is not so limited.

As shown in FIG. 15, various I/O devices 1514 may be coupled to first bus 1516, along with a bus bridge 1518 which couples first bus 1516 to a second bus 1520. In one embodiment, one or more additional processor(s) 1515, such as coprocessors, high-throughput MIC processors, GPGPU's, accelerators (such as, e.g., graphics accelerators or digital signal processing (DSP) units), field programmable gate arrays, or any other processor, are coupled to first bus 1516. In one embodiment, second bus 1520 may be a low pin count (LPC) bus. Various devices may be coupled to a second bus 1520 including, for example, a keyboard and/or mouse 1522, communication devices 1527 and a storage unit 1528 such as a disk drive or other mass storage device which may include instructions/code and data 1530, in one embodiment. Further, an audio I/O 1524 may be coupled to the second bus 1520. Note that other architectures are possible. For example, instead of the point-to-point architecture of FIG. 15, a system may implement a multi-drop bus or other such architecture.

Figure 16:
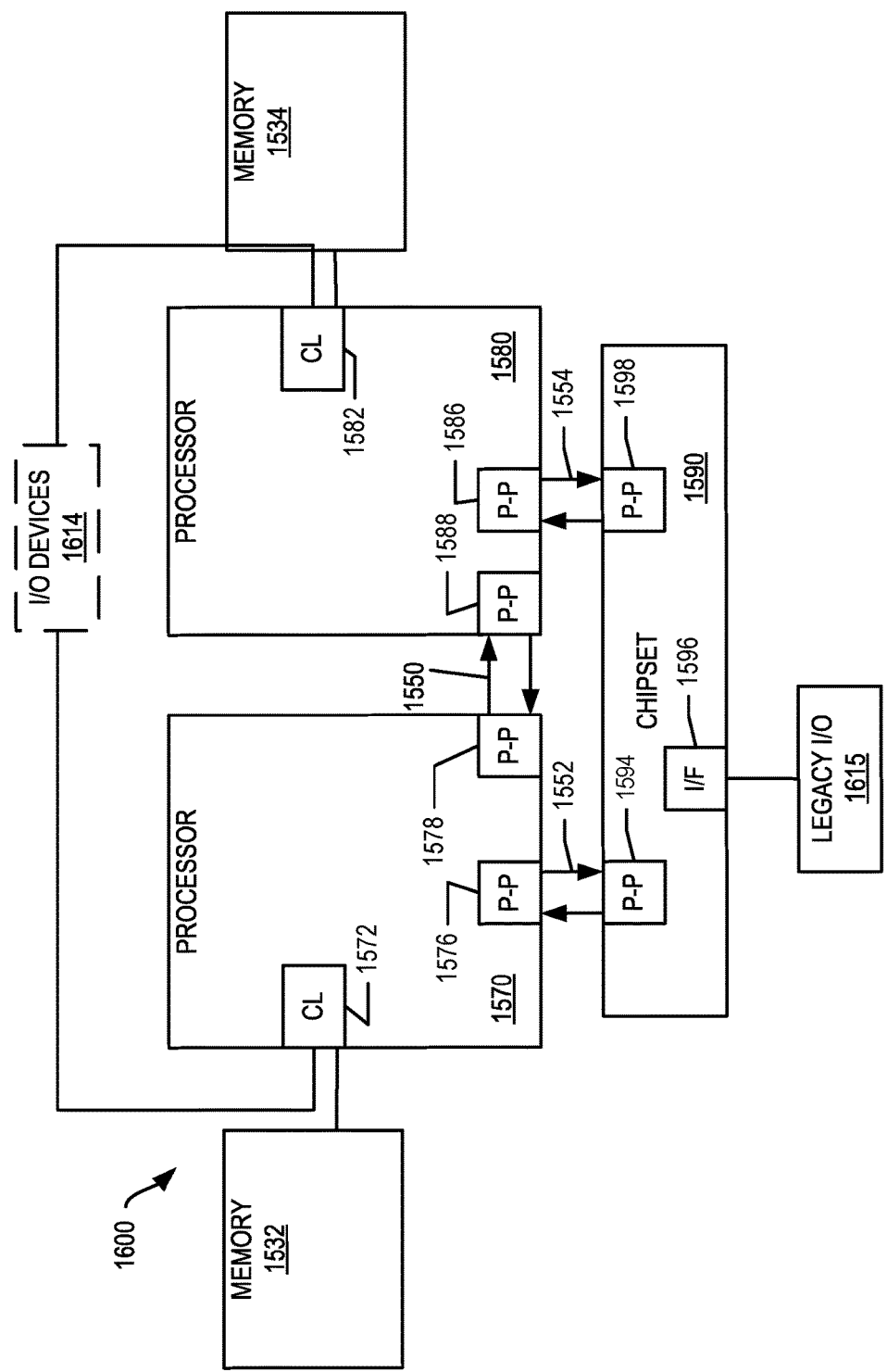
FIG. 16 is a block diagram of a second more specific exemplary system in accordance with an embodiment of the present invention.

Referring now to FIG. 16, shown is a block diagram of a second more specific exemplary system 1600 in accordance with an embodiment of the present invention. Like elements in FIGS. 15 and 16 bear like reference numerals, and certain aspects of FIG. 15 have been omitted from FIG. 16 in order to avoid obscuring other aspects of FIG. 16.

FIG. 16 illustrates that the processors 1570, 1580 may include integrated memory and I/O control logic ("CL") 1572 and 1582, respectively. Thus, the CL 1572, 1582 include integrated memory controller units and include I/O control logic. FIG. 16 illustrates that not only are the memories 1532, 1534 coupled to the CL 1572, 1582, but also that I/O devices 1614 are also coupled to the control logic 1572, 1582. Legacy I/O devices 1615 are coupled to the chipset 1590.

Figure 17:
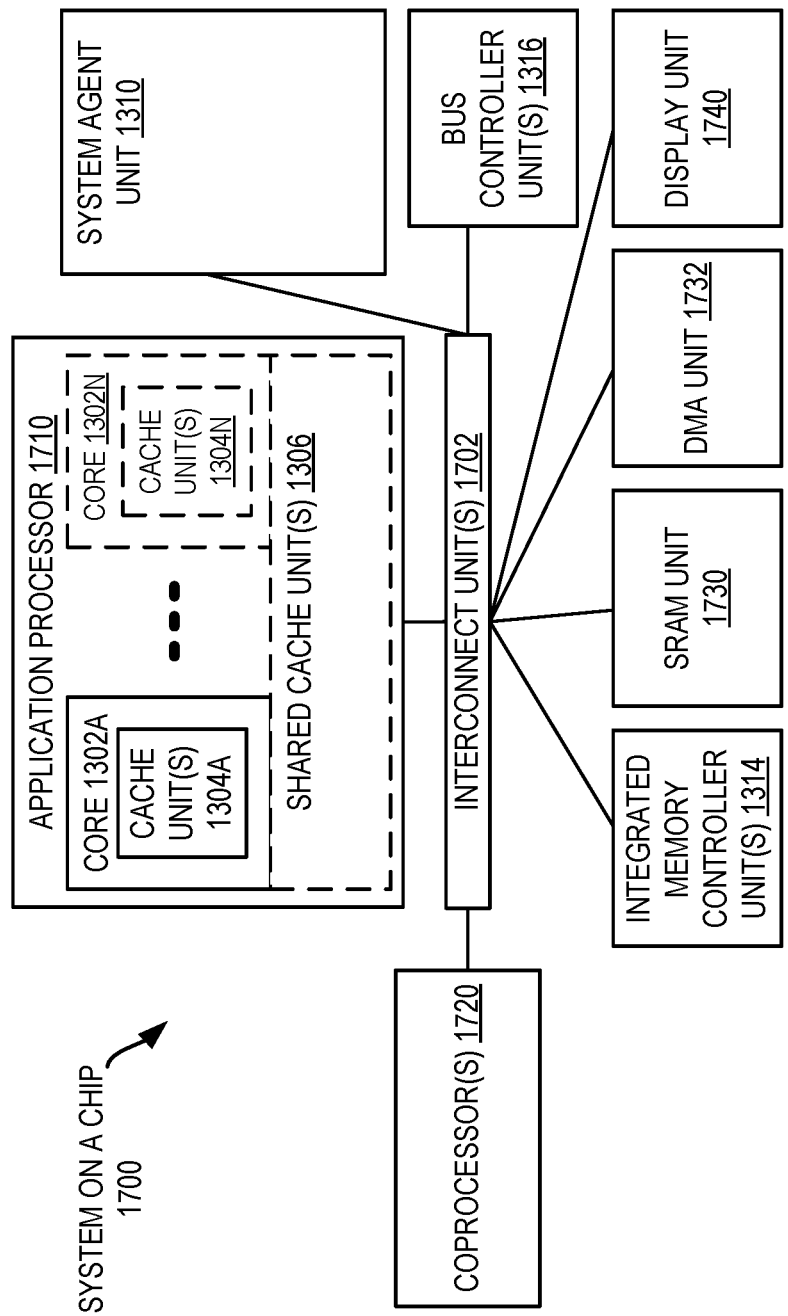
FIG. 17 is a block diagram of a SoC in accordance with an embodiment of the present invention.

Referring now to FIG. 17, shown is a block diagram of a SoC 1700 in accordance with an embodiment of the present invention. Similar elements in FIG. 13 bear like reference numerals. Also, dashed lined boxes are optional features on more advanced SoCs. In FIG. 17, an interconnect unit(s) 1702 is coupled to: an application processor 1710 which includes a set of one or more cores 202A-N and shared cache unit(s) 1306; a system agent unit 1310; a bus controller unit(s) 1316; an integrated memory controller unit(s) 1314; a set or one or more coprocessors 1720 which may include integrated graphics logic, an image processor, an audio processor, and a video processor; an static random access memory (SRAM) unit 1730; a direct memory access (DMA) unit 1732; and a display unit 1740 for coupling to one or more external displays. In one embodiment, the coprocessor(s) 1720 include a special-purpose processor, such as, for example, a network or communication processor, compression engine, GPGPU, a high-throughput MIC processor, embedded processor, or the like.

Embodiments of the mechanisms disclosed herein may be implemented in hardware, software, firmware, or a combination of such implementation approaches. Embodiments of the invention may be implemented as computer programs or program code executing on programmable systems comprising at least one processor, a storage system (including volatile and non-volatile memory and/or storage elements), at least one input device, and at least one output device.

Program code, such as code 1530 illustrated in FIG. 15, may be applied to input instructions to perform the functions described herein and generate output information. The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor.

The program code may be implemented in a high level procedural or object oriented programming language to communicate with a processing system. The program code may also be implemented in assembly or machine language, if desired. In fact, the mechanisms described herein are not limited in scope to any particular programming language. In any case, the language may be a compiled or interpreted language.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritable's (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, embodiments of the invention also include non-transitory, tangible machine-readable media containing instructions or containing design data, such as Hardware Description Language (HDL), which defines structures, circuits, apparatuses, processors and/or system features described herein. Such embodiments may also be referred to as program products.

Emulation (Including Binary Translation, Code Morphing, Etc.)

In some cases, an instruction converter may be used to convert an instruction from a source instruction set to a target instruction set. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part on and part off processor.

FIG. 18 is a block diagram contrasting the use of a software instruction converter to convert binary instructions in a source instruction set to binary instructions in a target instruction set according to embodiments of the invention. In the illustrated embodiment, the instruction converter is a software instruction converter, although alternatively the instruction converter may be implemented in software, firmware, hardware, or various combinations thereof. FIG. 18 shows a program in a high level language 1802 may be compiled using an x86 compiler 1804 to generate x86 binary code 1806 that may be natively executed by a processor with at least one x86 instruction set core 1816. The processor with at least one x86 instruction set core 1816 represents any processor that can perform substantially the same functions as an Intel processor with at least one x86 instruction set core by compatibly executing or otherwise processing (1) a substantial portion of the instruction set of the Intel x86 instruction set core or (2) object code versions of applications or other software targeted to run on an Intel processor with at least one x86 instruction set core, in order to achieve substantially the same result as an Intel processor with at least one x86 instruction set core. The x86 compiler 1804 represents a compiler that is operable to generate x86 binary code 1806 (e.g., object code) that can, with or without additional linkage processing, be executed on the processor with at least one x86 instruction set core 1816. Similarly, FIG. 18 shows the program in the high level language 1802 may be compiled using an alternative instruction set compiler 1808 to generate alternative instruction set binary code 1810 that may be natively executed by a processor without at least one x86 instruction set core 1814 (e.g., a processor with cores that execute the MIPS instruction set of MIPS Technologies of Sunnyvale, Calif. and/or that execute the ARM instruction set of ARM Holdings of Sunnyvale, Calif.). The instruction converter 1812 is used to convert the x86 binary code 1806 into code that may be natively executed by the processor without an x86 instruction set core 1814. This converted code is not likely to be the same as the alternative instruction set binary code 1810 because an instruction converter capable of this is difficult to make; however, the converted code will accomplish the general operation and be made up of instructions from the alternative instruction set. Thus, the instruction converter 1812 represents software, firmware, hardware, or a combination thereof that, through emulation, simulation or any other process, allows a processor or other electronic device that does not have an x86 instruction set processor or core to execute the x86 binary code 1806.

What is claimed is:

1. A method of performing in a computer processor generation of a predicate mask based on vector comparison in response to a single instruction that includes a single source writemask register operand, a destination writemask register operand, a control writemask operand, and an opcode, the method comprising of:
    decoding the instruction;
    executing the decoded instruction to determine a least significant bit position of the source writemask register that is a true value by determining a least significant bit position of the source writemask register that is a true value further comprises determining that a value in the control writemask register at a corresponding bit position is also true, and store a true value in each bit position of the destination writemask register that is of lesser significance than the determined corresponding bit position.

2. The method of claim 1, further comprising:
    storing a false value in each bit position of the destination writemask register that is of equal or greater significance than the determined corresponding bit position.

3. The method of claim 1, further comprising:
    storing a true value in a bit position of the destination writemask register that is of equal significance to the determined corresponding bit position.

4. The method of claim 1, wherein the registers are 16-bit registers.

5. The method of claim 1, wherein the registers are 64-bit registers.

6. An article of manufacture comprising:
    a non-transitory tangible machine-readable storage medium having stored thereon an occurrence of an instruction;
    wherein the instruction's format specifies as its source operand a single source writemask register, as its destination a single destination writemask register, and a control writemask operand;
    and wherein the instruction format includes an opcode which instructs a machine, responsive to the single occurrence of the single instruction, to cause a determination of a least significant bit position of the source writemask register that is a true value and storage of a true value in each bit position of the destination writemask register that is of lesser significance than a determined corresponding bit position, wherein the determination is to determine a least significant bit position of the source writemask register that is a true value further comprises determining that a value in the control writemask register at a corresponding bit position is also true.

7. The article of manufacture of claim 6, further comprising:
   storage of a false value in each bit position of the destination writemask register that is of equal or greater significance than the determined corresponding bit position.

8. The article of manufacture of claim 6, further comprising:
   storage of a true value in a bit position of the destination writemask register that is of equal significance to the determined corresponding bit position.

9. The article of manufacture of claim 6, wherein the registers are 16-bit registers.

10. The article of manufacture of claim 6, wherein the registers are 64-bit registers.

11. An apparatus comprising:
   a hardware decoder to decode an instruction that includes a single source writemask register operand, a destination writemask register operand, a control writemask operand, and an opcode; and
   execution circuitry to execute the decoded instruction to determine a least significant bit position of the source writemask register that is a true value and store a true value in each bit position of the destination writemask register that is lesser significance than a determined corresponding bit position by determining that a value in the control writemask register at a corresponding bit position is also true.

12. The apparatus of claim 11, further comprising:
   the execution circuitry to store a false value in each bit position of the destination writemask register that is of equal or greater significance than the determined corresponding bit position.

13. The apparatus of claim 11, further comprising:
   the execution circuitry to store a true value in a bit position of the destination writemask register that is of equal significance to the determined corresponding bit position.

14. The apparatus of claim 11, wherein the registers are 16-bit registers.

* * * * *